United States Patent
Kaburagi

(10) Patent No.: US 7,375,843 B2
(45) Date of Patent: May 20, 2008

(54) IMAGE PROCESSING APPARATUS AND IMAGE PROCESSING METHOD

(75) Inventor: Hiroshi Kaburagi, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 1078 days.

(21) Appl. No.: 10/723,749

(22) Filed: Nov. 25, 2003

(65) Prior Publication Data

US 2004/0109177 A1 Jun. 10, 2004

(30) Foreign Application Priority Data

Dec. 4, 2002 (JP) ............................. 2002-352879
Oct. 28, 2003 (JP) ............................. 2003-367683

(51) Int. Cl.
*G06K 15/00* (2006.01)
*G06K 9/32* (2006.01)
*B41B 15/00* (2006.01)

(52) U.S. Cl. ........................ 358/1.2; 358/3.07; 382/299

(58) Field of Classification Search ................. 358/1.2, 358/1.9, 1.11–1.18, 296, 3.07; 382/299
See application file for complete search history.

(56) References Cited

U.S. PATENT DOCUMENTS 5,109,283 A 4/1992 Carley
5,134,495 A 7/1992 Frazier

FOREIGN PATENT DOCUMENTS

JP 4-336859 A 11/1992

*Primary Examiner*—Gabriel Garcia
*Assistant Examiner*—Thierry L. Pham
(74) *Attorney, Agent, or Firm*—Canon U.S.A. Inc I.P. Div

(57) ABSTRACT

An image processing apparatus converts first image data of a first resolution N to second image data of a second resolution M, which is lower than the first resolution N, so as to output the second image data. The apparatus includes a processing unit for determining the position of a target pixel in the first image data in accordance with the ratio of the second resolution M to the first resolution N. The position of the target pixel is then used to define an area in which pixel values in the defined area are used to generate pixel values. The image processing apparatus also includes a selection signal generating unit for generating a selection signal in accordance with the target pixel value and an attribute signal representing the attribute of the target pixel. Also included in the image processing apparatus is an output unit for selecting one of the pixel values generated by the processing unit by using the selection signal so as to output the selected value as the second image data.

24 Claims, 17 Drawing Sheets

FIG. 6A
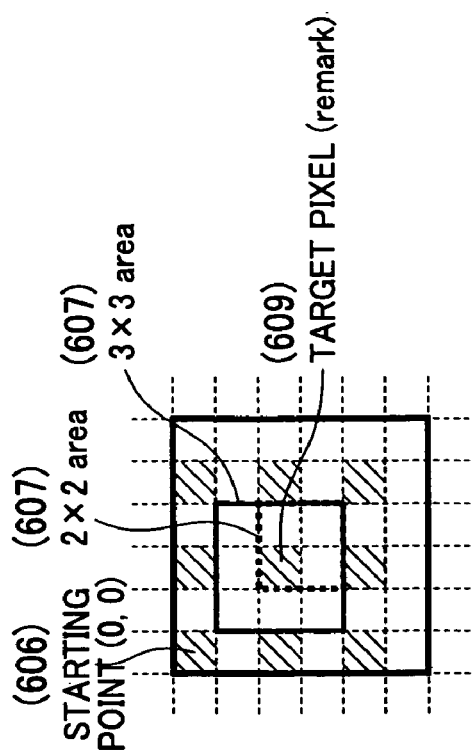
FIG. 6B
FIG. 6C
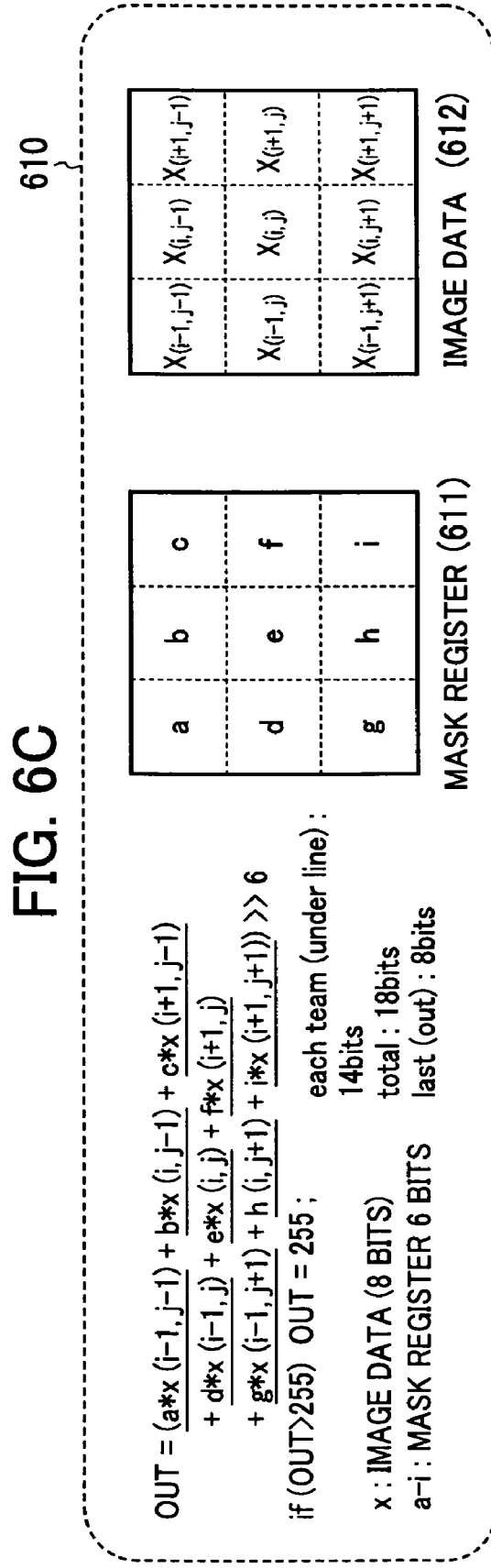

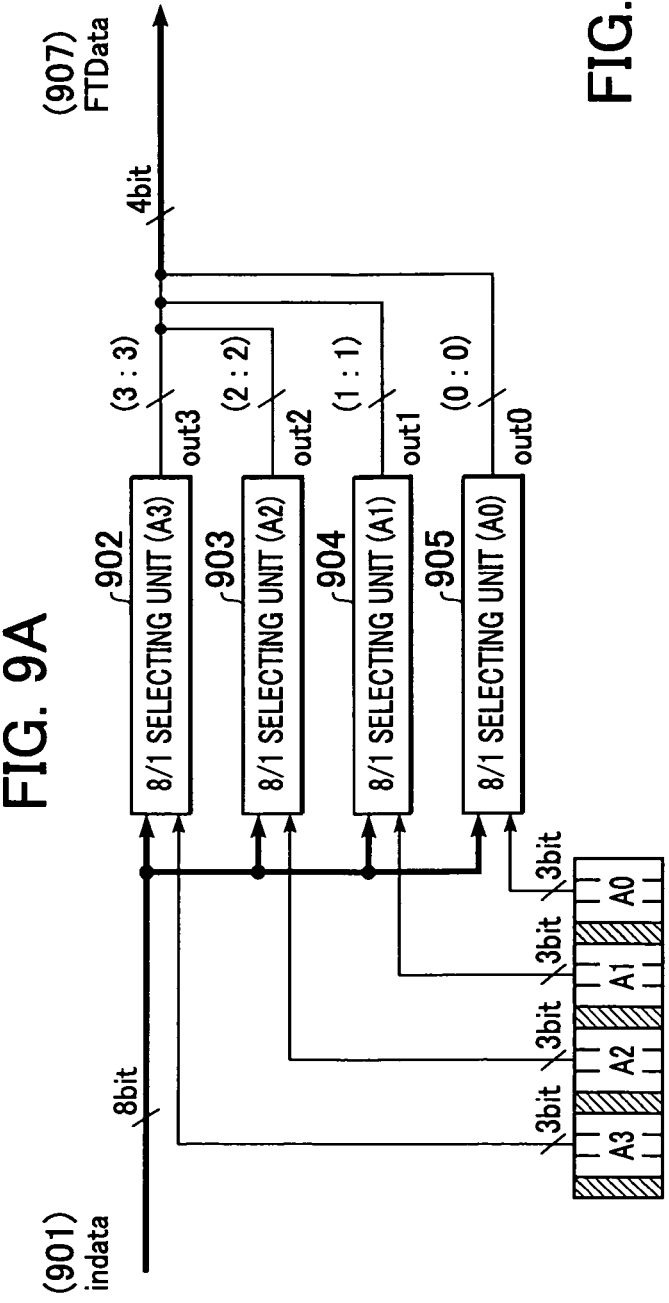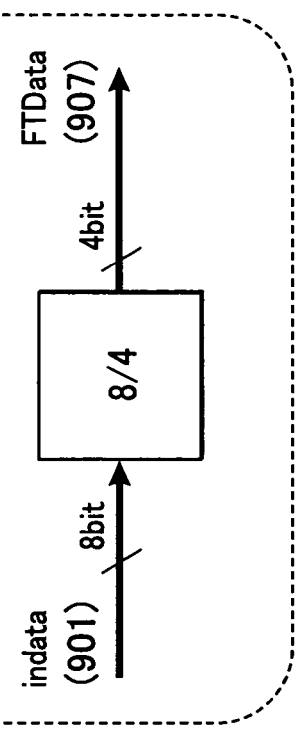

REGISTER A : 1 BIT (DEFAULT 0 × 1)
REGISTER B : 2 BITS (DEFAULT 0 × 0)
REGISTER C : 2 BITS (DEFAULT 0 × 0)
REGISTER D : 1 BIT (DEFAULT 0 × 1)
REGISTER E : 1 BIT (DEFAULT 0 × 1)

FIG. 14A

| 1401 | 1402 | 1403 | 1404 | 1405 | 1406 | | |
|---|---|---|---|---|---|---|---|
| bit3 | bit2 | bit1 | bit0 | Table Set | | | |
| minor font/line | image | graphic | font/graphic/image | input | output | | |
| 0 | 0 | 0 | 0 | 0 | 2 | No. 2 | non (1407) |
| 0 | 0 | 0 | 1 | 1 | 3 | No. 3~7 | font (1408) |
| 0 | 0 | 1 | 0 | 2 | 1 | No. 1 | graphic (1409) |
| 0 | 0 | 1 | 1 | 3 | 3 | No. 3~7 | font/graphic (1410) |
| 0 | 1 | 0 | 0 | 4 | 3 | No. 3~7 | image (1411) |
| 0 | 1 | 0 | 1 | 5 | 3 | No. 3~7 | font/image (1412) |
| 0 | 1 | 1 | 0 | 6 | 3 | No. 3~7 | graphic/image (1413) |
| 0 | 1 | 1 | 1 | 7 | 3 | No. 3~7 | font/graphic/image (1414) |
| 1 | 0 | 0 | 0 | 8 | 2 | No. 2 | non (1415) |
| 1 | 0 | 0 | 1 | 9 | 2 | No. 2 | minor font (1416) |
| 1 | 0 | 1 | 0 | 10 | 2 | No. 2 | minor graphic (1417) |
| 1 | 0 | 1 | 1 | 11 | 2 | No. 2 | minor font/graphic (1418) |
| 1 | 1 | 0 | 0 | 12 | 2 | No. 2 | minor image (1419) |
| 1 | 1 | 0 | 1 | 13 | 2 | No. 2 | minor font/image (1420) |
| 1 | 1 | 1 | 0 | 14 | 2 | No. 2 | minor graphic/image (1421) |
| 1 | 1 | 1 | 1 | 15 | 2 | No. 2 | minor font/graphic (1422) |

FIG. 14B input 4bit → BIT CONVERTING UNIT → output 2bit (412)

BIT SELECTION REGISTER (1602)

FIG. 18 no3

| 7 | 7 | 7 |
|---|---|---|
| 7 | 8 | 7 |
| 7 | 7 | 7 | no4

| 6 | 6 | 6 |
|---|---|---|
| 6 | 16 | 6 |
| 6 | 6 | 6 | no5

| 4 | 4 | 4 |
|---|---|---|
| 4 | 32 | 4 |
| 4 | 4 | 4 | no6

| 2 | 2 | 2 |
|---|---|---|
| 2 | 48 | 2 |
| 2 | 2 | 2 | no7

| 1 | 1 | 1 |
|---|---|---|
| 1 | 56 | 1 |
| 1 | 1 | 1 |

IMAGE PROCESSING APPARATUS AND IMAGE PROCESSING METHOD

BACKGROUND OF THE INVENTION

1. Field of the Invention

The present invention relates to a resolution converting process for outputting high-resolution image signals in a low-resolution image output device.

2. Description of the Related Art

In image processing devices such as a printer, a copier, and a multi function peripheral (MFP), a Page Description Language (PDL) signal is expanded to bitmap data by the device controller. The bitmap data is output in a resolution equal to the resolution at expansion. For example, data expanded to 600 dpi can be output by using a 600 dpi printer.

Also, even when the controller receives a signal which has been expanded to bitmap data, the signal is output in a resolution equal to the resolution of the received bitmap data. In another technique, the PDL signal is expanded to 300 dpi bitmap data, the data is then doubled for output by a 600 dpi printer, in order to increase bitmap expansion speed.

In these known arts, the resolution of the expanded PDL signal is equal to or lower than the resolution of the printer. Therefore, it is difficult to obtain image quality of higher resolution than the resolution of the printer.

On the other hand, a technique for expanding PDL data to bitmap data in a resolution higher than that of the printer has been proposed. In this technique, for example, PDL data is expanded to 1200 dpi bitmap data, and each pixel of the expanded data is output by a 600 dpi printer using spot multiple-layered technology. In this way, image quality equivalent to 1200 dpi can be expressed by using a 600 dpi printer. Spot multiple-layered technology is disclosed in U.S. Pat. No. 5,134,495, for example. Also, spot multiplexing can be realized by converting pulse width so that a plurality of dots are formed in a basic cell of input data to be printed. This technique is disclosed in U.S. Pat. No. 5,109,283 and JP Patent Publication No. H04-336859.

In the above-described techniques, high-resolution data has to be expanded in a controller. For example, a signal expanded to 1200 dpi has to be (A) compressed, (B) spooled, (C) expanded, and (D) image processed, thus the controller needs to have a spec four times as large as the spec for processing 600 dpi data.

Further, problems can occur in (D) image processing. For example, when 1200 dpi data is processed with a line memory, the line memory capacity must be twice as large as that used for processing 600 dpi data. Another disadvantage is in the error diffusion process for image processing. In order to perform the error diffusion process, the errors of some lines of input image data has to be held. This also causes an increase in memory capacity requirements. For example, the memory capacity required to process 1200 dpi data is twice larger than that for 600 dpi in the main scanning (X direction).

On the other hand, when 1200 dpi data is processed in a spec for 600 dpi, the processing speed decreases, or processing cannot be executed in some cases. Therefore, these methods are not commercially practical.

In addition, when resolution conversion is performed by using spot multiple-layered technology, and the controller outputs image data to an image output device using electrophotography, image processing which consider non-linear characteristics of electrophotography cannot be performed. The reason for this is that there is no choice but to uniformly convert the image data to 600 dpi in a printer engine (laser controller) when the spot multiple-layered technology is used. Herein, uniform conversion means that a product-sum operation process is performed by using a predetermined weighting coefficient without consideration of input levels. That is, since the predetermined coefficients are the fixed values without distinction of input signal levels, uniform conversion is performed.

SUMMARY OF THE INVENTION

It is an object of the present invention to suppress effects of a resolution converting process on images and load image processing devices and controllers when the resolution is decreased, so as to output higher-fineness images. An image processing apparatus of the present invention converts first image data of a first resolution N to second image data of a second resolution M, which is lower than the first resolution N, so as to output the second image data. The apparatus includes a processing unit for determining the position of a target pixel in the first image data in accordance with the ratio of the second resolution M to the first resolution N, and generating and outputting a plurality of pixel values based on values of pixels in a predetermined area defined by the target pixel; a selection signal generating unit for generating a selection signal in accordance with the value of the target pixel and an attribute signal representing the attribute of the target pixel; and an output unit for selecting one of the plurality of pixel values generated by the processing unit by using the selection signal so as to output the selected value as the second image data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 6A, 6B, and 6C show an example of the configuration of a product-sum operation processing unit of the embodiment.

FIGS. 9A and 9B are functional block diagrams showing an example of the configuration of 8/4 converting units of the embodiment.

FIGS. 14A and 14B illustrate a bit converting unit of the embodiment.

FIG. 18 shows setting examples of mask registers.

DESCRIPTION OF THE PREFERRED EMBODIMENTS

An image processing apparatus of the present invention converts a first digital signal of a first resolution N (for example, 1200 dpi) to a second digital signal of a second resolution M (for example, 600 dpi), which is lower than the first resolution N. In this apparatus, the position of a target pixel in a first image signal of the first digital signal is determined in accordance with the ratio of the resolution M to the resolution N, operation is performed by using pixel values in an area based on the target pixel, a selection signal is generated based on both the value of the target pixel and an attribute signal representing the attribute of the target pixel, and an operation result is selected by using the generated selection signal, so as to output the second digital signal.

Also, in the image processing apparatus of the present invention, a density level of the target pixel can be set, and the selection signal is generated in accordance with the set density level. Further, the attribute signal of the target pixel is a second attribute signal having the resolution M, which is determined based on a signal belonging to the area determined by the target pixel in a first attribute signal of the first digital signal.

The present invention can be performed in accordance with the following embodiment illustrated in the attached drawings.

Embodiment of the Present Invention

Hereinafter, an embodiment of the present invention will be described with reference to the drawings. Herein, an MFP (multi function peripheral) using an electrophotographic technology is described as a preferred embodiment.

<Entire Structure of MFP>

Figure 2:
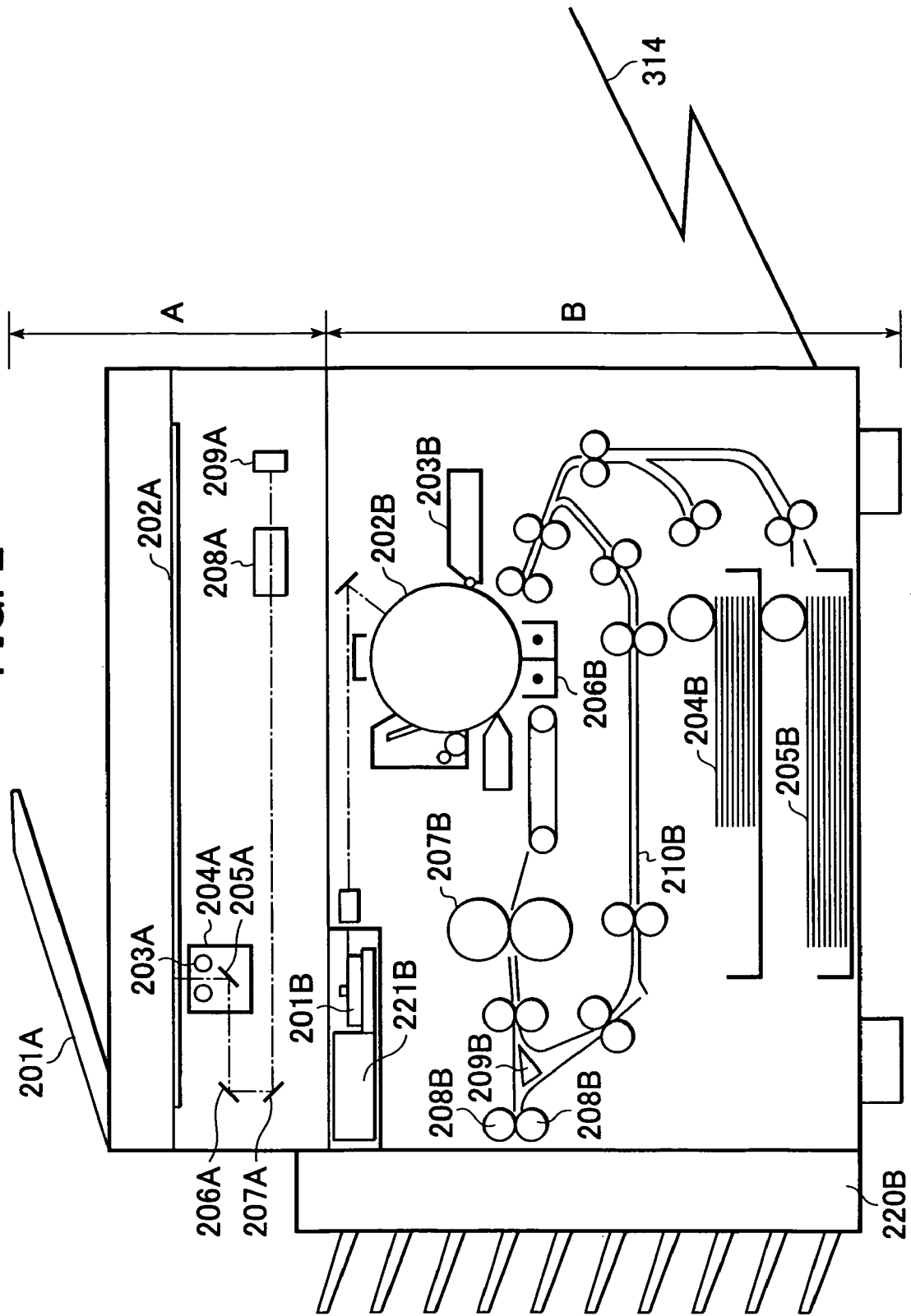
FIG. 2 is a schematic view of a mechanical structure of an MFP of the embodiment.

FIG. 2 is a schematic cross-sectional view showing a mechanical structure of an MFP according to the embodiment. As shown in the figure, the MFP includes a color scanner unit A and a printer unit B.

First, the color scanner unit A will be described. A paper feeder 201A feeds sheets of paper one after another from the last page onto a platen glass 202A. Each sheet is read and is then ejected. When the sheet is transported onto the platen glass 202A, a lamp 203A is lit, and a scanner unit 204A having the lamp 203A is moved so as to scan the sheet by exposure. Reflected light from the sheet generated by the scanning is sensed by a CCD color image sensor (hereinafter referred to as CCD) 209A through mirrors 205A, 206A, and 207A, and a lens 208A. Then, the reflected light is separated into three colors R, G, and B and they are read as luminance signals. The luminance signals are output from the CCD 209A and are A-D converted to image data of digital signals, which are input to an image processing unit 304 (see FIG. 3). The image processing unit 304 performs general image processing, such as shading correction, tone correction, and binarization, and then the processed image data is transferred to the printer unit B (305).

Next, the printer unit B will be described. A laser driver 221B drives a laser light emitting unit 201B to emit laser light corresponding to image data of each color output from the image processing unit 304. The laser light is radiated to form a latent image on the surface of the photoconductive drum 202B. Then, a developing device 203B applies toner, which is developer, to the latent image portion on the photoconductive drum 202B. In FIG. 2, only one developing device is shown for simplicity. However, toner for each of colors C, M, Y, and K may be prepared, and four or more developing devices may be provided accordingly. Alternatively, four or more pairs of photoconductive drum and developing device may be provided for the four colors.

In synchronization with start of radiation of the laser light, sheets of paper are fed from a cassette 204B or 205B so as to be transported to a transfer unit 206B. Accordingly, the developer adhered to the photoconductive drum 202B can be transferred onto the sheet. The sheet is then transported to a fuser 207B, where the developer is fused into the sheet by heat and pressure. The sheet, which has passed through the fuser 207B, is ejected out of the apparatus by ejecting rollers 208B. A sorter 220B accommodates these ejected sheets in predetermined bins so as to sort the sheets.

When sort is not set, the sorter 220B puts the sheets in the top bin. When two-sided recording is set, each sheet is transported to the ejecting rollers 208B, the rotation direction of the ejecting rollers 208B is reversed, and then the sheet is led to a re-transport path 210B by a flapper 209B. When multiple recording is set, the sheet is led to the re-transport path 210B by the flapper 209B so that the sheet is not transported to the ejecting rollers 208B. The sheet led to the re-transport path 210B is fed to the transfer unit 206B at the above-described timing. As known, formation of latent images, development, and fusing for the four colors can be realized by performing latent image formation and so on four times by using the above-described sheet transport mechanism.

In FIG. 2, reference numeral 314 denotes a network communication link, such as a cable. Herein, a system of Ethernet® is used. Of course, the present invention is not limited to a cable network using a network cable, but the same environment can be established by using a wireless system.

The printer unit B can receive PDL signals and image bitmap signals from a PC through the network cable, and output the signals by using the above-described printer engine.

<System Structure>

Next, an electrical process in the MPU, which has been described with reference to FIG. 2, will be described with reference to FIG. 3. An image reading unit 309 includes a lens 301, a CCD sensor 302, and an analog signal processor 303. A document image 300 formed in the CCD sensor 302 through the lens 301 is converted to an analog electric signal by the CCD sensor 302. The converted image information is input to the analog signal processor 303, which performs sample-and-hold and dark level correction, and then the image information is A-D converted. The generated digital signal is input to the image processing unit 304, which is a characteristic element of the present invention.

Also, signals which are transmitted through a network 313 are input to the image processing unit 304. The signals include PDL signals of PostScript (PS) and LIPS, which are transmitted from a PC 315. Of course, each PDL signal may be compressed. In that case, the PDL signal is expanded in the image processing unit 304 (configuration for expansion is not shown). The image processing unit 304 can perform correction required in a reading system, such as shading correction and Y-correction, and smoothing and edge enhancement, as well as the above-described compression/expansion. After these processes, the image processing unit 304 outputs the image signal to the printer 305.

Although not shown, the printer 305 includes an exposure Control unit including a laser or the like, an image forming unit, and a sheet transport control unit. The printer 305 records input image signals onto sheets of paper.

A CPU circuit unit 310 includes a CPU 306, a ROM 307, and a RAM 308, and controls the image reading unit 309, the image processing unit 304, the printer unit 305, and an operation unit 317, so as to control the entire sequence of the apparatus.

A RAM 311 and a ROM 312 are prepared in the operation unit 317, so that characters can be displayed in a UI and that information set by a user can be stored.

The information set in the operation unit 317 by the user is transferred to the image reading unit 309, the image processing unit 304, and the printer 305, through the CPU circuit unit 310.

<Configuration of Image Processing Unit>

Next, the image processing unit 304 according to the present invention will be described with reference to FIG. 1. First, the entire flow of signals in the embodiment will be described.

Figure 3:
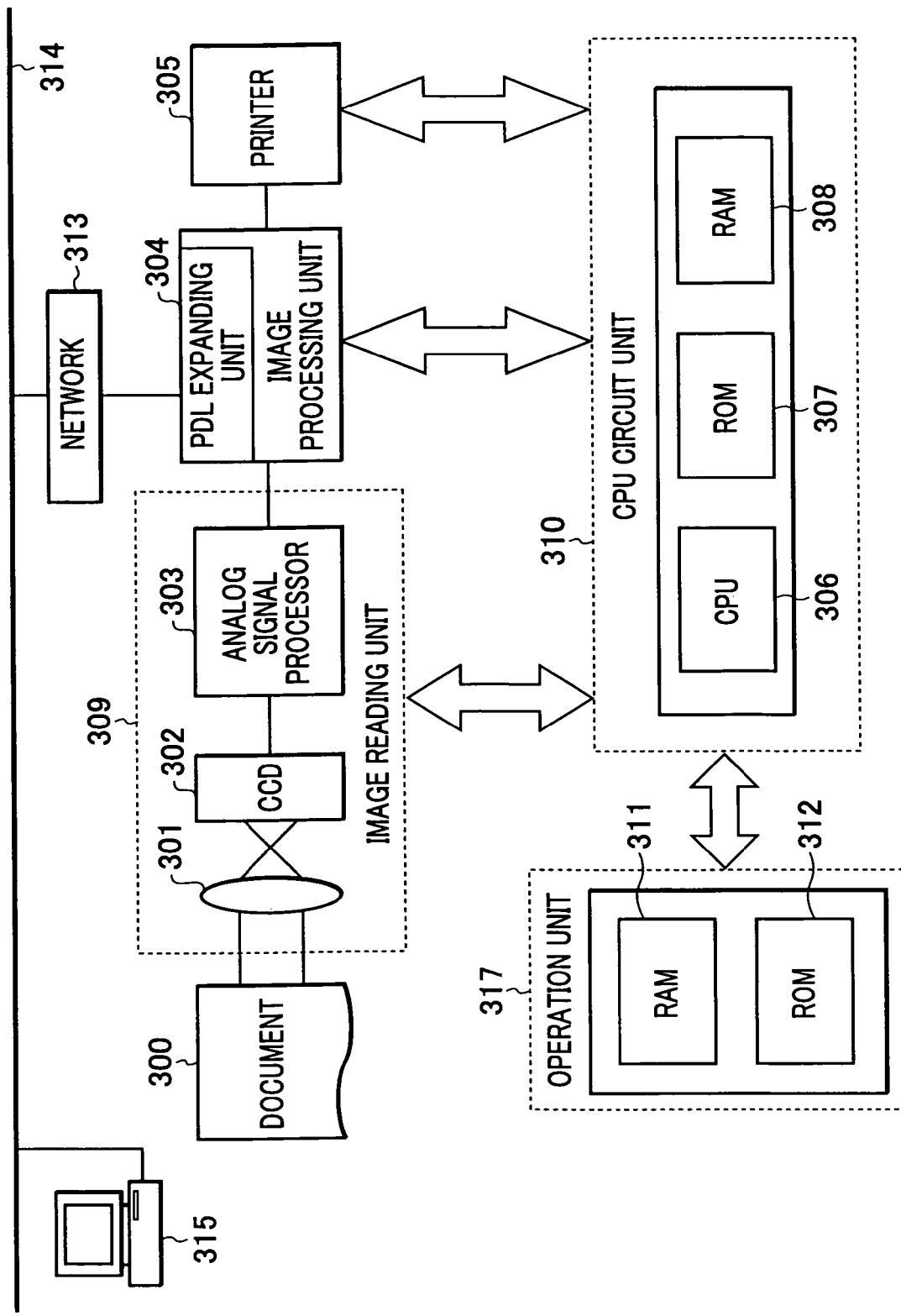
FIG. 3 is a block diagram showing the system structure of the embodiment.

In FIG. 3, a PDL signal is transmitted from the PC 315 through the network cable 314 and the network 313 to the image processing unit 304, which expands the PDL signal. That is, information described in PDL language is converted to bitmap raster data. In particular, the PDL signal is expanded to an image signal of 1200 dpi by the image processing unit 304. The expansion technique is known, and thus the corresponding description will be omitted.

Then, the 1200 dpi image signal is converted to a 600 dpi image signal by using a method described later. Thereafter, the 600 dpi image signal is output to the printer 305. The conversion to 600 dpi is characteristic of the present invention, so that 1200 dpi data can be converted to 600 dpi data while holding the phase information of the 1200 dpi image. That is, a resolution of 1200 dpi can be expressed by 600 dpi output in proportions of characters (font) and lines.

Although, in the embodiment, a 1200 dpi signal is converted to a 600 dpi signal, this is an example of a conversion process, and the present invention is not limited to the conversion technique in these resolutions. Other resolutions can be employed.

Hereinafter, the signal conversion technique will be described. In FIG. 1, a 1200 dpi image-area signal (Z sig.) 112 and a 1200 dpi data 113 are input signals, which are PDL-expanded image signals. More specifically, the 1200 dpi data 113 is an image signal and the 1200 dpi image-area signal 112 is an image-area signal corresponding to its pixel. The image-area signal is applied to each pixel and serves as an identification signal representing attribute information: whether the pixel belongs to font, graphics, or image.

Figure 1:
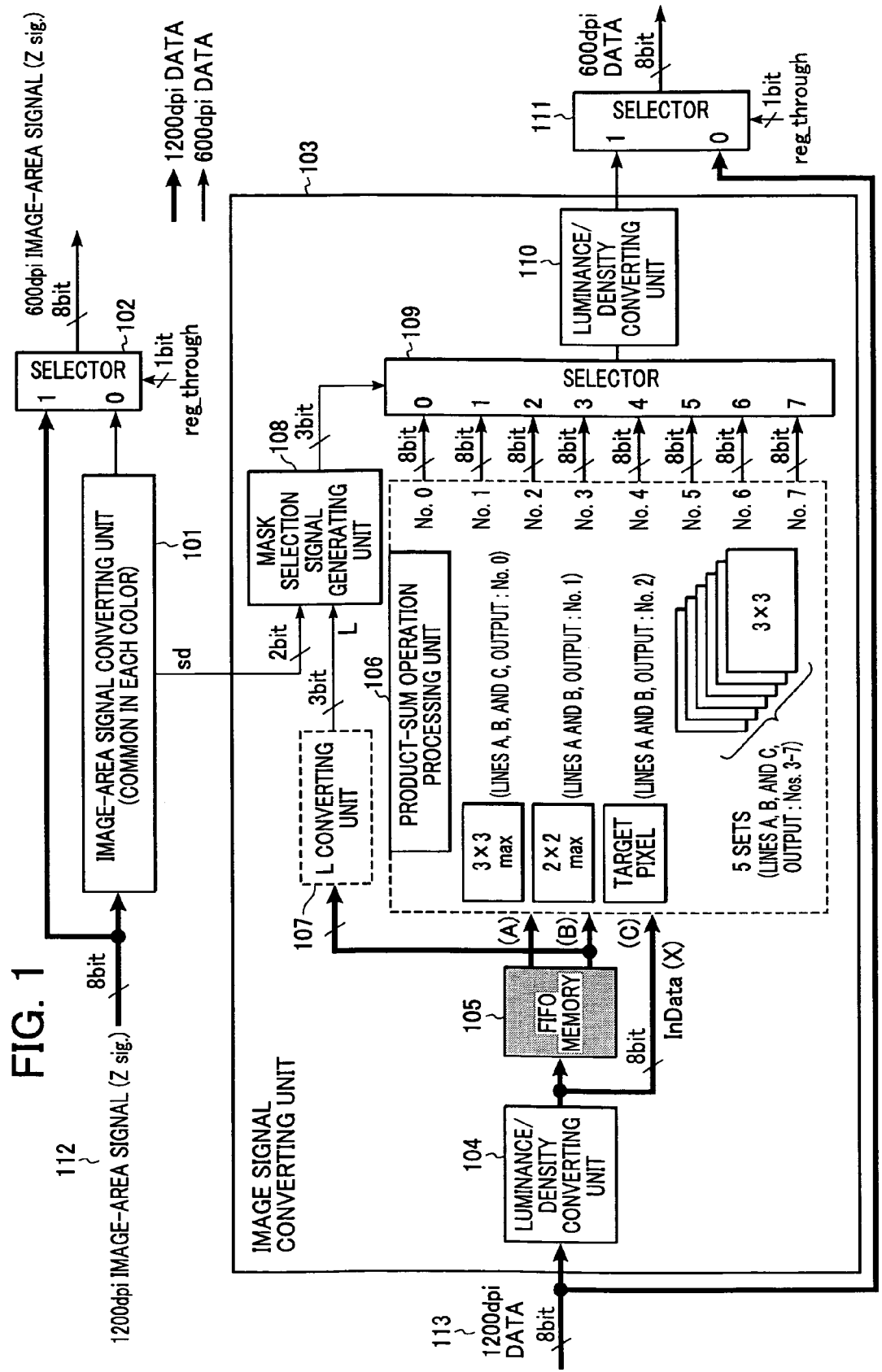
FIG. 1 is a functional block diagram showing an example of the configuration of an image processing unit according to an embodiment of the present invention.

In FIG. 1, an image-area signal converting unit 101, which will be described later, converts the 1200 dpi image-area signal to a 600 dpi image-area signal.

Each of selectors 102 and 111 selects to output the 1200 dpi image-area signal or to output the 600 dpi image-area signal respectively, by using a reg_through signal from a register. The 600 dpi image-area signal is generated by the image-area signal converting unit 101. An image signal converting unit 103 converts a 1200 dpi image signal to 600 dpi. Hereinafter, the image signal converting unit 103 will be described in detail.

<Image Signal Converting Unit>

Figure 5:
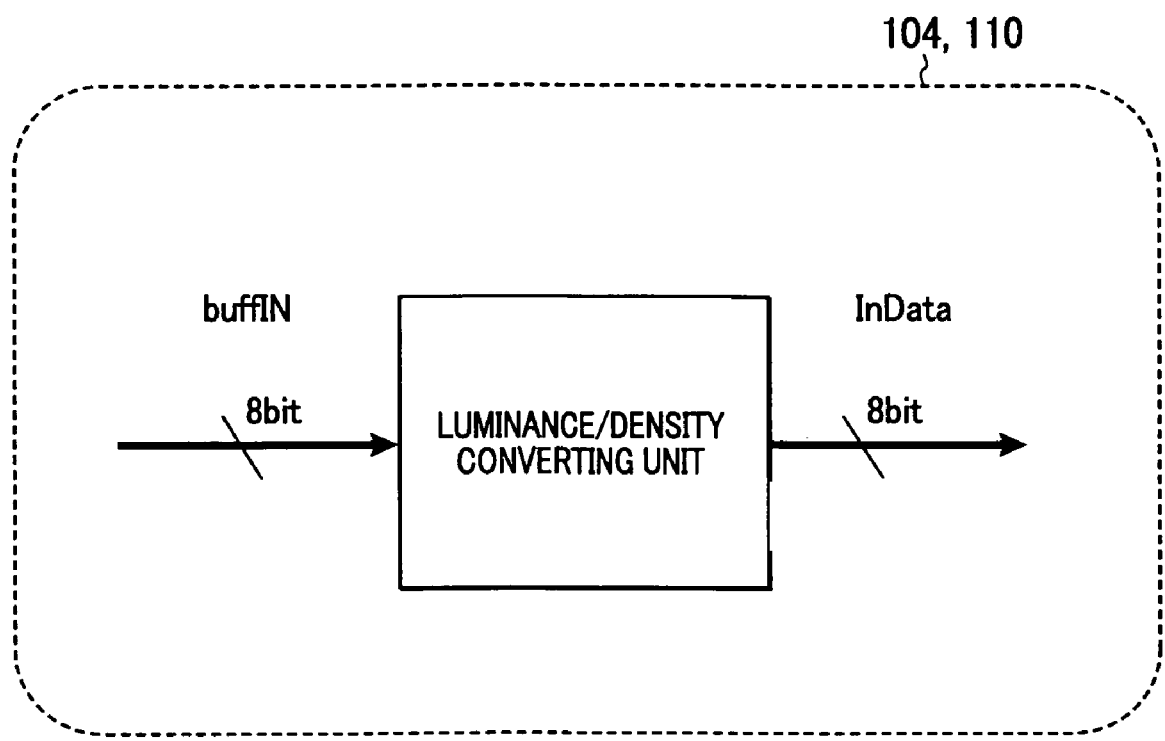
FIG. 5 is a functional block diagram showing an example of the configuration of a luminance/density converting unit of the embodiment.

The image signal converting unit 103 includes luminance/density converting units 104 and 110. When a signal expanded at 1200 dpi is a luminance signal, the luminance signal is inverted in the luminance/density converting units 104 and 110. FIG. 5 is a block diagram showing each of the luminance/density converting units with the names of input/output signals. In the figure, the input signal is buffIN and the output signal is InData. When the input signal buffIN is a luminance signal, the luminance/density converting units 104 and 110 invert the luminance signal if a switching signal input based on register setting is 1, but outputs the input signal as is if the switching signal is 0. Herein, inversion means that 255 in an 8-bit signal becomes 0.

An 8-bit FiFo memory 105 provides delays by 2 lines for a product-sum operation processing unit 106, which will be described later. Accordingly, only operations with a mask size of 3×3 at the maximum can be performed. Also, a signal (B) of a target pixel line is input to an L converting unit 107, so as to be converted to a 3-bit signal by a process, described later.

The product-sum operation processing unit 106 performs eight types of processes. These processes include detecting a maximum value in a 3×3 area (No. 0); detecting a maximum value in a 2×2 area (No. 1); outputting the value of a target pixel as is (No. 2); and performing product-sum operation in five-types of 3×3 areas in which coefficients are different (No. 3 to No. 7). These processes will be described with reference to FIGS. 6A to 6C.

FIG. 6A shows the entire product-sum operation processing unit 106. An input signal InData (x) 601 includes three 8 bit lines: Line (A) 602; Line (B) 603; and Line (C) 604. An 8 bit output signal, OUT 605 is also shown. FIG. 6B shows the range of each area to a target pixel 609. As shown in this figure, the relationship between the target pixel 609 and a 3×3 area 608 is different from that between the target pixel 609 and a 2×2 area 607.

In FIG. 6B, target pixel 609 is specified by oblique lines. In shift of blocks in the product-sum operation processing unit 106, the target pixel 609 is selected as every other pixel in a main scanning direction or a sub scanning direction. (Actually, physical blocks are not shifted in a memory (register), but a process of inputting 9 pixels to a 3×3 memory (register) is performed. Herein, this expression is used for easy understanding.) That is, in FIG. 6B, when the pixel at a starting point (0,0) is regarded as a target pixel in a 3×3 area, the center of the 3×3 area corresponds to the target pixel. Then, after a product-sum operation process using 9 pixels is performed, the center of the 3×3 area is shifted from the starting point (0,0) to the second pixel therefrom in the right direction (main scanning direction), and then a product-sum operation process is performed by using the target pixel and surrounding 8 pixels. Note that the shift direction is not limited to the right.

For example, as indicated by oblique lines, when pixels of 1200 dpi are processed, every other pixel (in a case of main scanning direction) or every other line (in a case of sub scanning direction), one of every two pixels is generally thinned (removed), and thus the number of pixels in the main scanning direction and in the sub scanning direction is reduced to ½. As a result, the 1200 dpi data can be converted to 600 dpi data. In the present invention, however, one of every two pixels is not simply thinned. Details of the process will be described later.

Hereinafter, each process will be described in order. To detect a maximum value in a 3×3 area, which is output to No. 0 of the product-sum operation processing unit 106 (FIG. 1), values of pixels in a 3×3 area including a target pixel in FIG. 6B are compared so as to detect a maximum pixel value among 9 pixel values. Likewise, to detect a maximum value in a 2×2 area, which is output to No. 1, a maximum pixel value in the 2×2 area in FIG. 6B is detected.

Further, a target pixel value is output as is to No. 2. That is, a signal of the target pixel in Line (B) is output. The output value of No. 3 is a result of product-sum operation performed in the range of 3×3. The details of this operation will be described with reference to FIG. 6C. Each of a to i in a mask register 611 in FIG. 6C is a register set value (weighting coefficient to be multiplied to each pixel), and a value of 6 bits is arbitrarily set to each of a to i. A product-sum operation is performed based on the following equation (shown in FIG. 6C) by using each of the register set values and input signals x of corresponding pixels in image data 612.

$$OUT = (a*x(i-1, j-1) + (b*x(i, j-1) +$$
$$(c*x(i+1, j-1) + (d*x(i-1, j) +$$
$$(e*x(i, j) + (f*x(i+1, j) + g*$$
$$x(i-1, j+1) + (h*x(i, j+1) +$$
$$(i*x(i+1, j+1)) >> 6$$

(Equation 1)

In this operation, the product of the input signal x of each pixel and a register set value at the corresponding position is obtained in each of 9 pixels, the products of 9 pixels are added, and the sum value is shifted to the right by 6 bits. The bit shift is equivalent to a process of dividing the sum value by 64. The obtained result is clipped by 255 so as to obtain a final result, which is output from No. 3.

In the equation for OUT shown in FIG. 6C, each underlined element has 14 bits. Since the operation result is finally clipped by 255, output OUT is 8-bit data. A product-sum operation in a 3×3 area has been described above. On the other hand, by setting a, b, c, d, and g among register set values a, b, c, d, e, f, g, h, and i to 0, a product-sum operation in a 2×2 area can be realized.

In each of Nos. 4 to 7 (FIG. 1), an operation which is the same as the operation for outputting No. 3 is performed by using arbitrary mask registers 611. Coefficients set in the mask registers 611 may be different in each output, or may be the same. These coefficients are set in the registers in advance by using a CPU.

The set values used in the embodiment are different in each output as shown in FIG. 18. In each of Nos. 3 to 7, the above-described product-sum operation is performed by using these coefficients and input image signals corresponding to the positions of the coefficients. These coefficients are used for controlling generated half dots depending on the level of input signal.

For example, when the value of an input signal is small, a coefficient of No. 3 is used so that half dots adjoining dark dots do not become too small by a product-sum operation. On the other hand, when the value of an input signal is large, a coefficient of No. 7 is used so that half dots adjoining dark dots do not be too dark. Herein, the input signal is a signal from the L converting unit 107, which is generated by converting the value of a target pixel to 3 bits.

As a result of the above-described operation, Nos. 0 to 7 are output from the product-sum operation processing unit 106 in FIG. 1, and any of them can be selected by the selector 109, to which a signal described later is input. The image processing unit 304 of the embodiment is characterized in that processes can be optimally switched for each pixel in accordance with the characteristic and value (density level) of each pixel. Further, by performing the above-described processes in the image processing unit 304, adaptive image conversion considering non-linear characteristics of electrophotography can be realized.

Referring back to FIG. 1, the L converting unit 107 includes a memory for 8-bit address space and 3-bit data, and receives a target pixel value of 8 bits on Line (B). The L converting unit 107 outputs a 3-bit signal. For example, a value "X/52+3" is set to the L converting unit 107. The X is substituted by a target pixel value: any of 0 to 255. That is, any of target pixel values 0 to 255 is substituted into X, so that any of values 3 to 7 can be obtained by an operation in the L converting unit 107. This value reflects the density of a target pixel. Remainders generated in the above operation are dropped.

Figure 7:
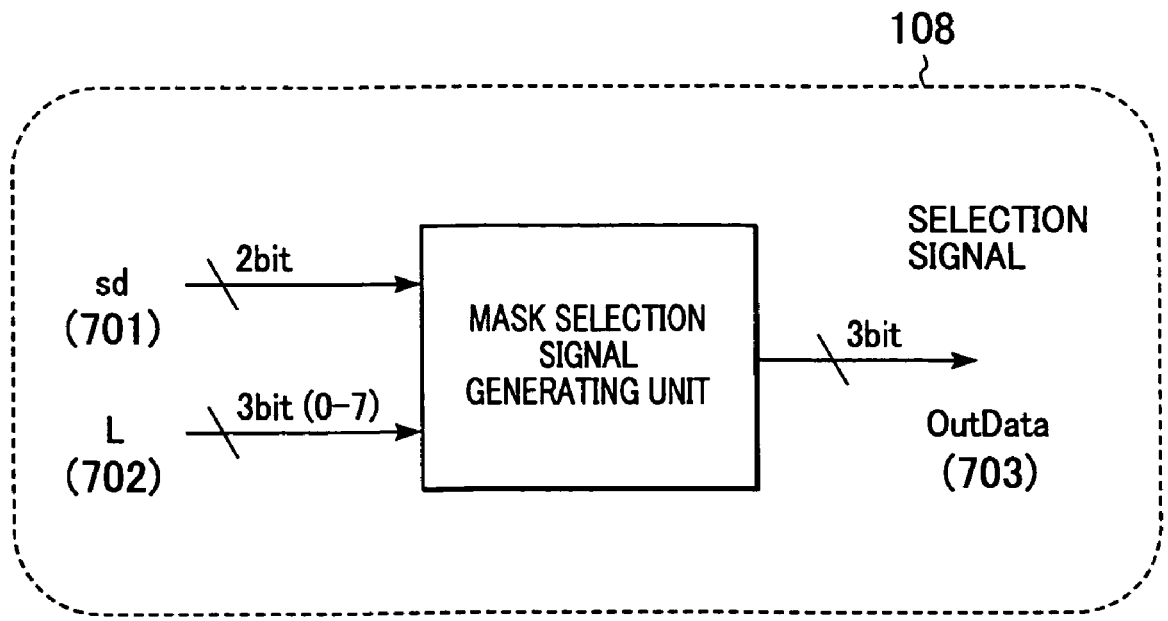
FIG. 7 is a functional block diagram showing an example of the configuration of a mask selection signal generating unit of the embodiment.
Figure 8:
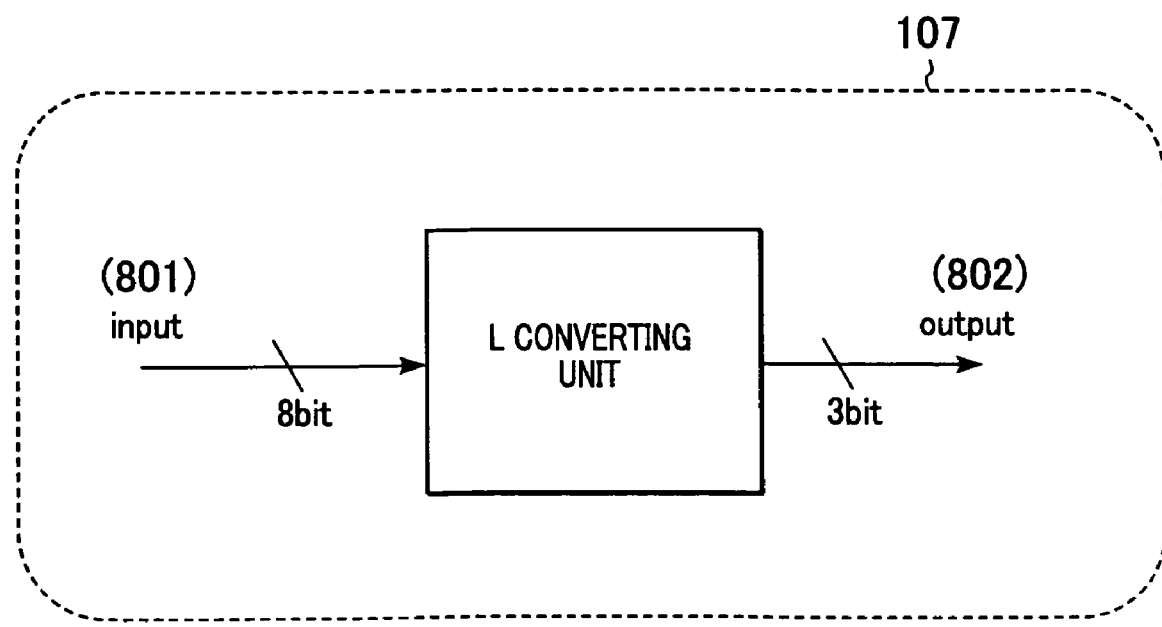
FIG. 8 is a functional block diagram showing an example of the configuration of an L converting unit of the embodiment.

A mask selection signal generating unit 108 generates a signal used for selecting the results of product-sum operations in Nos. 0 to 7. The generating process will be described with reference to FIG. 7. An output signal L 702 from the L converting unit 107 and output sd 701 from the image-area signal converting unit 101 are input to the mask selection signal generating unit 108, which generates a selection signal 703 of 3 bits, which is output to the selector 109.

More specifically, the selection signal 703 is generated in accordance with the value of the 2-bit sd signal 701. The output signal 703 from the mask selection signal generating unit 108 is used for selecting one of outputs Nos. 0 to 7. Accordingly, the mask selection signal has 3 bits sufficient to represent outputs Nos. 0 to 7. When the sd signal 701 is any of Nos. 0 to 2, a selection signal 703 for selecting any of Nos. 0 to 2 is output, and when the sd signal 701 is 3, a selection signal 703 is output based on the value of the L signal (density value of a target pixel). The L signal is a 3-bit signal. However, the output from the L converting unit 107 is any of 3 to 7, and thus a selection signal 703 (any of 3 to 7) for selecting any of Nos. 3 to 7 is output.

Output Nos. 3 to 7 of mask selection signal generating unit 108 are generated by referring to the density value of the input image signal of 1200 dpi. Thus, an optimal product-sum operation result can be selected in accordance with the density level of the input signal 113. That is, a product-sum operation result can be selected for each pixel by considering the non-linear characteristic of electrophotography. Of course, this can be applied to a selection considering a smear of ink in a printer in which images are formed by ejecting ink, such as an inkjet printer.

Further, in the image processing unit 304, control can be performed by using the value of the sd signal 701 generated by the image-area signal converting unit 101, and thus a result output from the product-sum operation processing unit 106 can be arbitrarily selected for each of a character portion, a minor font (for example, under 4 points), a line portion, and an image portion. That is, resolution converting processes can be switched for minor font in which importance is put on readability, and characters in which importance is put on proportion. For example, a target pixel value of No. 2 is selected for minor font of under 4 points. Otherwise, any of product-sum operation results in Nos. 3 to 7 is selected. Further, an image quality of 1200 dpi can be realized in only an arbitrary image area or an arbitrary density. In this way, excellent effects can be obtained.

By selecting any of eight types of outputs from the product-sum operation processing unit 106 using a selection signal output from the mask selection signal generating unit 108, 1200 dpi data can be converted to 600 dpi data while maintaining the 1200 dpi image quality. This process can be realized because a resolution converting process is performed in accordance with the characteristic of each pixel of the input 1200 dpi data by using the value of each pixel (density value) and an image-area signal of each pixel.

The 600 dpi data signal from selector 109 which has image quality equivalent to 1200 dpi is transmitted to the printer through the luminance/density converting unit 110 and the selector 111 so as to be output. Therefore, even when the printer has an output resolution of only 600 dpi, a quality similar to 1200 dpi can be ensured by using data which has been processed in the manner of the embodiment.

<Image-area Signal Converting Unit>

Figure 4:
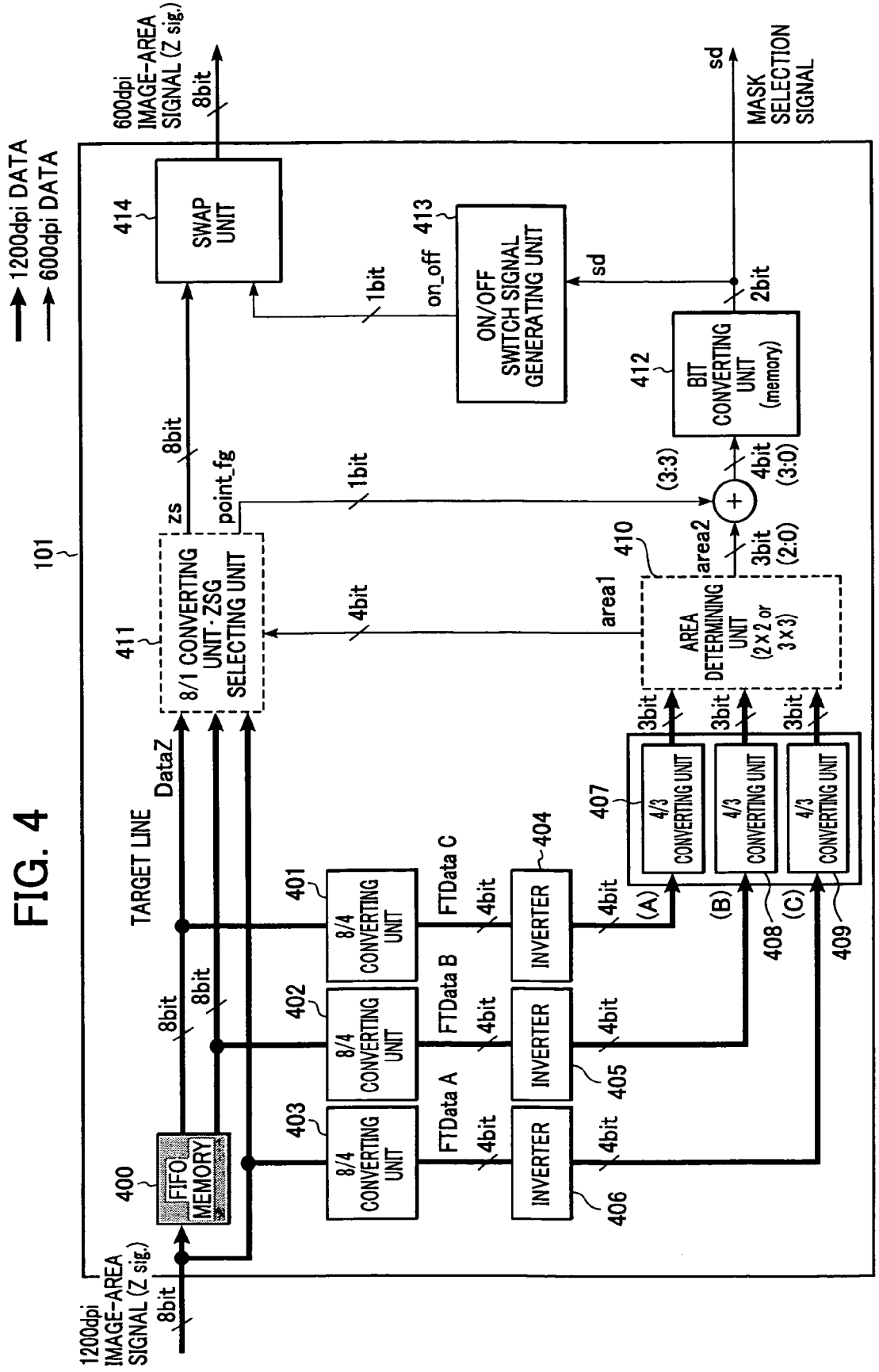
FIG. 4 is a functional block diagram illustrating a resolution converting process of an image-area signal of the present invention.

Now, the image-area signal converting unit 101 will be described. FIG. 4 is a block diagram showing the entire image-area signal converting unit 101. The image-area signal converting unit 101 includes a FiFo memory 400 of 8 bits, which introduces delay by 2 lines as the FiFo memory 105. With this configuration, a process in the range of 3×3 can be realized.

8/4 converting units 401, 402, and 403 are processing units for converting input 8-bit signals to 4-bit signals. A process performed by each of the 8/4 converting units 401 to 403 will be described with reference to FIGS. 9A and 9B. FIG. 9B is a block diagram showing the entire 8/4 converting unit, in which input is represented by 8-bit indata 901 and output is represented by 4-bit FTData 907.

FIG. 9A shows an example of an internal configuration of the 8/4 converting unit. A0, A1, A2, and A3 constitute a bit selection register 906 of 3 bits, and each of them specifies and selects a bit. More specifically, when the indata 901 of 8 bits is input, each of four registers 902 to 905 selects 1 bit based on an arbitrary bit specified by the bit selection register 906. As a result, 4-bit output can be obtained as the FTData 907.

For example, when 8-bit data "00101000" is input as the indata 901 and when the corresponding output from A3 of the bit selection register 906 is "010", the 8/1 selecting unit 902 selects the third bit, and thus output out3 is 0. This is the same for the other 8/1 selecting units 903 to 905, each of which outputting 1 bit.

Referring to FIG. 4, inverters 404 to 406 invert signals. Herein, inversion means bit inversion, for example, an input signal "1111" is inverted to "0000", or an input signal "1010" is inverted to "0101".

Figure 10A:
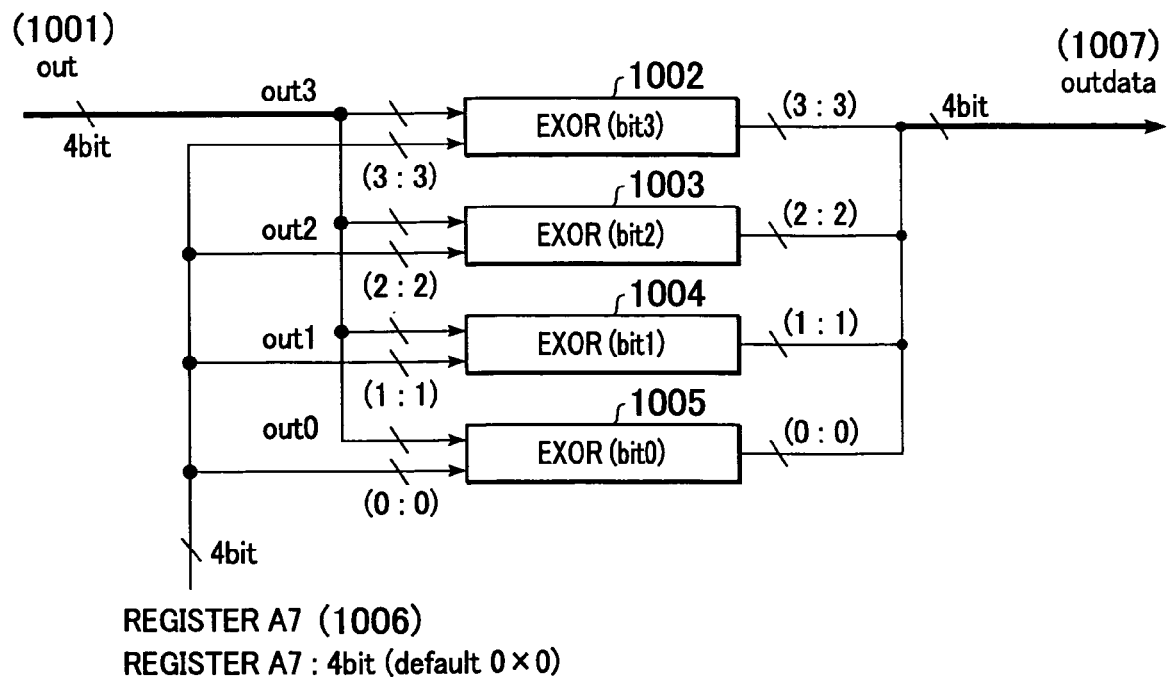
FIGS. 10A and 10B are functional block diagrams showing an example of the configuration of inverters of the embodiment.
Figure 10B:
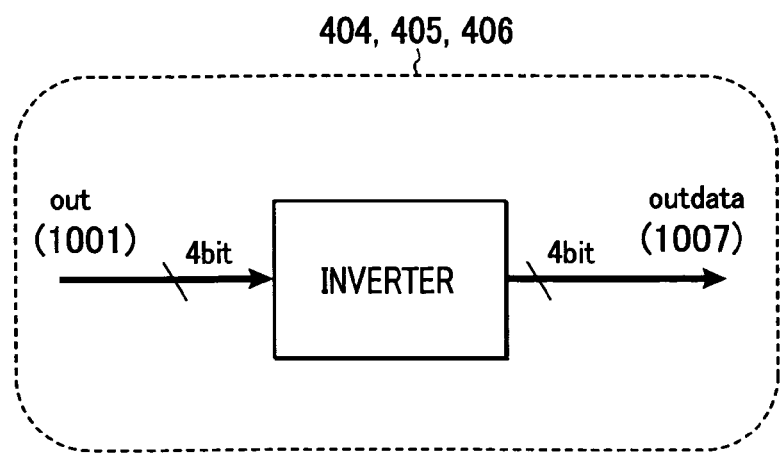

Details of the inverters 404 to 406 will be described with reference to FIGS. 10A and 10B. FIG. 10B is a block diagram showing the entire inverter and FIG. 10A is a block diagram showing an example of an internal configuration of the inverter. In FIG. 10A, a register A7 (1006) is a 4-bit selection signal and can invert a specified arbitrary bit.

Specifically, the inverter includes exclusive-or operation units (hereinafter referred to also as EXORs) 1002 to 1005. Each of the EXORs performs exclusive-or operation by using the register A7 (1006) and an input signal 1001. The EXOR 1002 outputs an operation result for bit 3, the EXOR 1003 for bit 2, the EXOR 1004 for bit 1, and the EXOR 1005 for bit 0. Therefore, when the register A7 is "1111", all of the bit 3 to bit 0 of the input signal 1001 are inverted and output, and when the register A7 is "1000", only bit 3 is inverted and output.

In FIG. 4, each of 4/3 converting units 407 to 409 generates a 3-bit image-area signal based on a 4-bit signal, which has been obtained by converting an 8-bit image-area signal in the 8/4 converting unit. The input image-area signal has 8 bits in the embodiment, and thus includes various types of information. In order to reduce the amount of information, 4 bits are selected in the 8/4 converting unit, and the selected 4 bits are converted to 3 bits. This method is more preferable than directly converting 8 bits to 3 bits, because the amount of delay memory can be reduced and the cost can be effectively reduced.

Figure 11A:
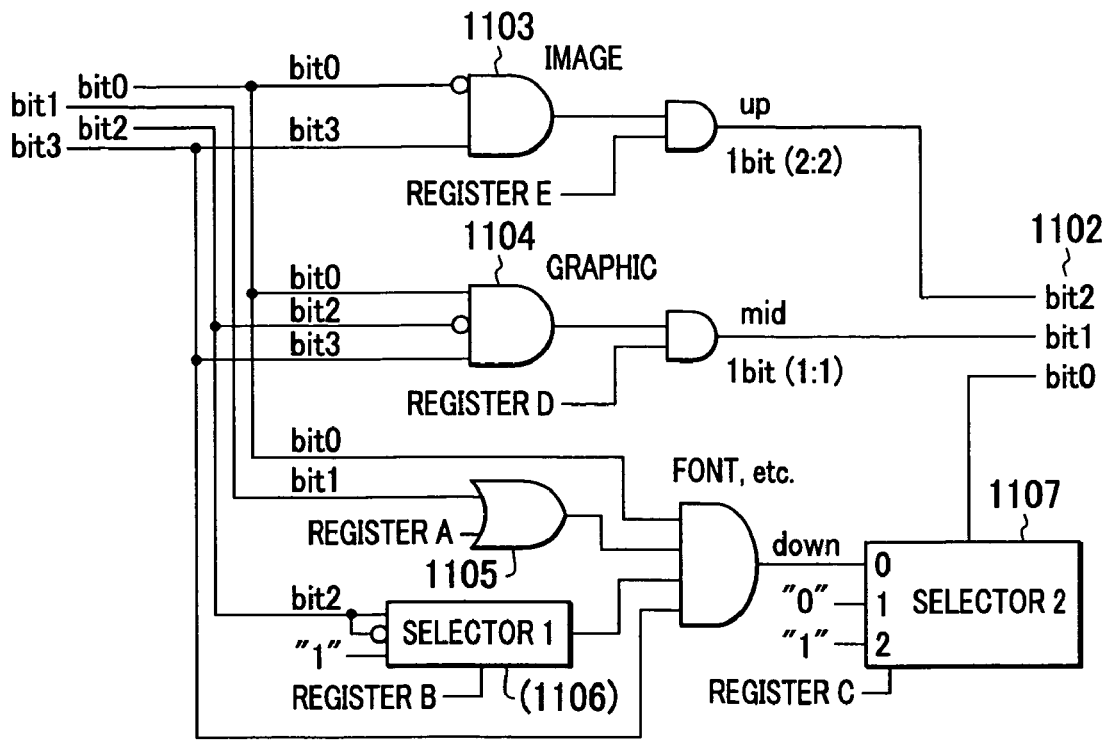
FIGS. 11A and 11B are functional block diagrams showing an example of the configuration of 4/3 converting units of the embodiment.
Figure 11B:
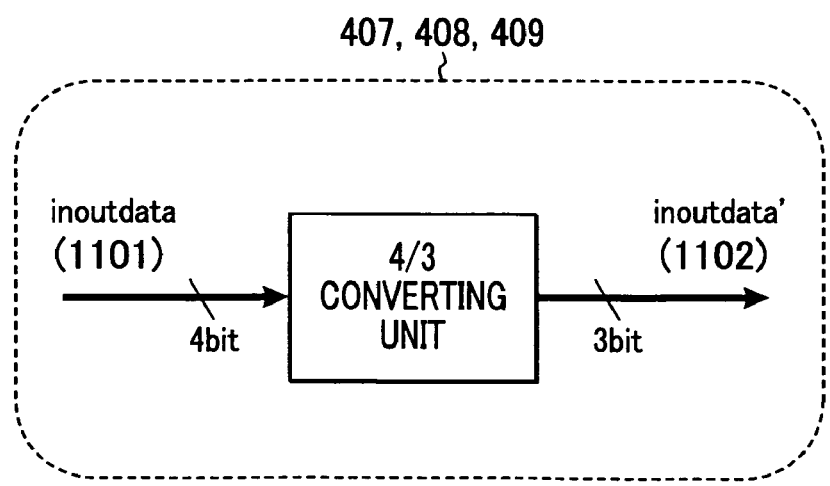

Next, a process performed in each of the 4/3 converting units will be described with reference to FIGS. 11A and 11B. FIG. 11B is a block diagram showing the entire 4/3 converting unit, and FIG. 11A shows an example of an internal configuration thereof. In FIG. 11B, an inoutdata 1101 of 4 bits is input and an inoutdata' 1102 of 3 bits is output.

FIG. 11A logically shows the process, in which bit 0 to bit 3 correspond to the inoutdata 1101 shown in FIG. 11B. The inoutdata 1101 is the above-described image-area signal generated by selecting arbitrary bits. Also, bit 0 to bit 2 correspond to the inoutdata' 1102 shown in FIG. 11B, which is a newly generated image-area signal.

Each of 4 bits in the inoutdata 1101 used in the embodiment represents the followings. Of course, this is only an example, and the number of bits and the meaning of each bit is not limited to this example.

bit 0: vector (1), non-vector (0)
bit 1: chromatic color (1), achromatic color (0)
bit 2: character (1), non-character (0)
bit 3: with object (1), without object (0)

The 4/3 converting unit generates an image-area signal based on the input signal 1101 by setting registers A to E shown in FIG. 11A.

The register A provides a signal for setting whether bit 1 should be determined as a chromatic signal. The register B is a signal for setting whether a character/non-character signal of bit 2 should be used as is, or should be inverted, or fixed for character determination. The register C is a signal for setting whether or not an image-area determination relating to characters should be used or forcefully set to 1 or 0. The register D is a signal for setting whether or not an image-area determination relating to graphics should be used. The register E is a signal for setting whether or not an image-area determination relating to images should be used.

That is, in the image-area signal generated in this manner, bit 2 represents determination of images, bit 1 represents determination of graphics, and bit 0 represents determination of font.

In the embodiment, image, graphics, and font are allotted to bit 2, bit 1, and bit 0, respectively. However, the order may be changed, for example, font, image, and graphics are allotted to bit 2, bit 1, and bit 0, respectively.

An area determining unit 410 shown in FIG. 4 performs the following process in a 2×2 area or 3×3 area. Details of the process will be described with reference to FIGS. 12A and 12B.

Figure 12A:
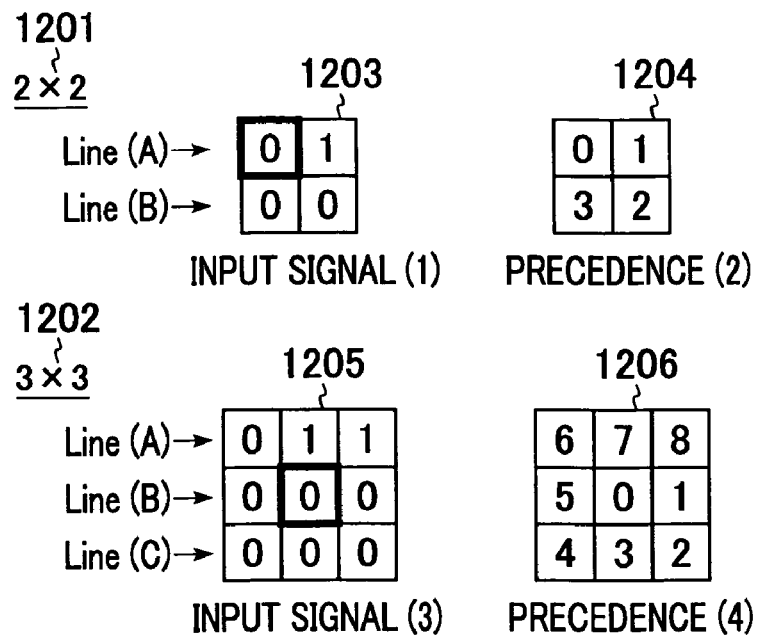
FIGS. 12A and 12B are functional block diagrams showing an example of the configuration of an area determining unit of the embodiment.
Figure 12B:
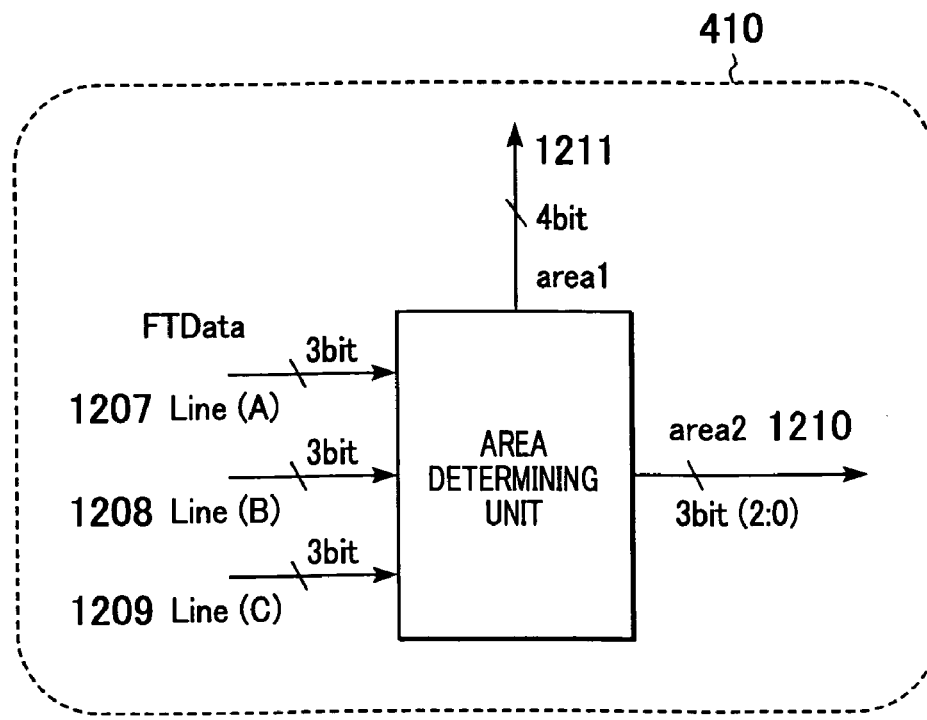

FIG. 12B is a block diagram showing the entire area determining unit 410. Three lines of 3 bits (Line (A) 1207, Line (B) 1208, and Line (C) 1209) of FTData signals, which have been output from the 4/3 converting units 407 to 409, respectively, are input to the area determining unit 410. Then, area 1 (1211) of 4 bits and area 2 (1210) of 3 bits are output therefrom.

FIG. 12A shows a 2×2 area (1201) and a 3×3 area (1202). In each area, a portion of a thick frame is a target pixel. The area to be used is determined based on the setting of a register TT (not shown). The numbers 0 to 8 drawn in (2) and (4) of FIG. 12A indicate precedence of pixels to be processed, and the numbers 0 and 1 drawn in (1) and (3) indicate the values of input signals FTData. Herein, only 0 and 1 are shown. However, since FTData is a 3-bit signal, it is clear that signals 0 to 7 exist.

The precedence shown in (2) and (4) is determined based on a distance from the target pixel. For example, in the 3×3 area shown in (4), the highest priority is put on the target pixel, and the priority decreases away from the target pixel. Of course, the present invention is not limited to this order of precedence, and the order may be changed to a counter-clockwise direction. The highest priority is put on the position of the target pixel and the precedence decreases with the distance from the target pixel. In the case of 2×2 area shown in (2), the area is small and thus the above explanation is difficult to understand, but the order of precedence is determined in the same manner.

The above-described process is performed in the 3×3 area or the 2×2 area in order to determine whether or not an arbitrary image-area signal exists in the area when the resolution is converted from 1200 dpi to 600 dpi. Accordingly, applying this method to only characters (font) can be performed according to the detected signal.

Hereinafter, details of the process will be described. First, when the register TT is set at 0, the 2×2 area 1201 is selected. Then, the maximum value in the input signal FTData is detected based on the precedence shown in 1204. Then, the position of precedence where the maximum value has been detected is output as an area 1 signal 1211. That is, the pixel position having a maximum value is determined in the 2×2 area 1201. Also, the OR of values of the four pixels is output as an area 2 signal 1210.

On the other hand, when the register TT is set at 1, the 3×3 area 1202 is selected so as to perform a process. The process is the same as that performed for the 2×2 area 1201, and thus the corresponding description is omitted. However, since the area is wider (3×3), the area 1 signal is 0 to 8 and the number of output bits is 4. The other features remain the same as in the above description.

Although a fixed value may be set to the register TT, the value may be changed through the CPU in accordance with the attribute of input data, such as characters and graphics. For example, for fine data such as characters, the 2×2 area is selected so as to prevent corruption of converted data. For graphics including lines and figures, the 3×3 area is selected.

The area determining unit 410 converts 1200 dpi data to 600 dpi data by performing processing every other pixel or every other line, as in the product-sum operation processing unit 106 shown in FIG. 1. However, the area determining unit 410 performs the above-described mask process in addition to a thinning process, and thus an image-area signal equivalent to 1200 dpi can be expressed with data, which has been converted to 600 dpi.

Also, it would be clear for those skilled in the art that the above-described process at every other pixel or every other line can be adopted when 2400 dpi data is converted to 1200 dpi data. Further, when a resolution is decreased to ¼, for example, when 2400 dpi data is converted to 600 dpi data, a mask size is set to 4×4 or 5×5 and processing is performed every four pixels or every four lines. In this way, a maximum image quality can be maintained and image data of ¼ resolution can be obtained.

A 8/1 converting & ZSG selecting unit 411 in FIG. 4 detects minor images in an area and selects input DataZ at an arbitrary position in accordance with the above-described area 1 signal 1211. DataZ is an input image-area signal of 1200 dpi. However, when any of image-area signals in a predetermined area, such as a 3×3 area, indicates predetermined information such as a minor character, the image-area signal of the target signal in the area is converted to a signal indicating the information.

Hereinafter, the process will be described with reference to FIGS. 13A to 13C. FIG. 13B is a block diagram showing the entire 8/1 converting & ZSG selecting unit 411. Herein, 8-bit image-area signals 1301 of 1200 dpi and the 4-bit area 1 signal 1211 are input, and 1-bit point_fg signal 1308 and 8-bit zs signal 1309 are output. The point_fg signal 1308 indicates whether or not a minor image exists in the area, and the zs signal 1309 is an image-area signal selected by the area 1 signal 1211.

Figure 13A:
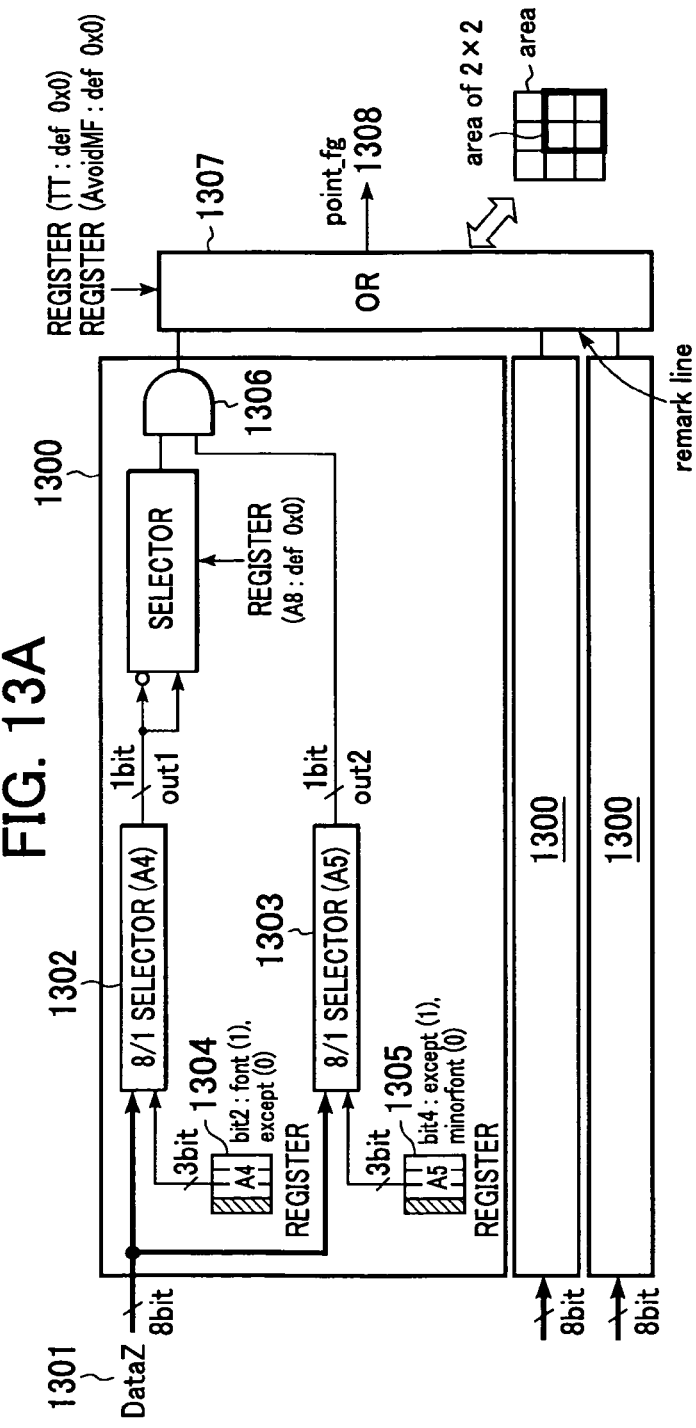
FIGS. 13A to 13C are functional block diagrams showing an example of the configuration of a 8/1 converting and ZSG selecting unit of the embodiment.
Figure 13B:
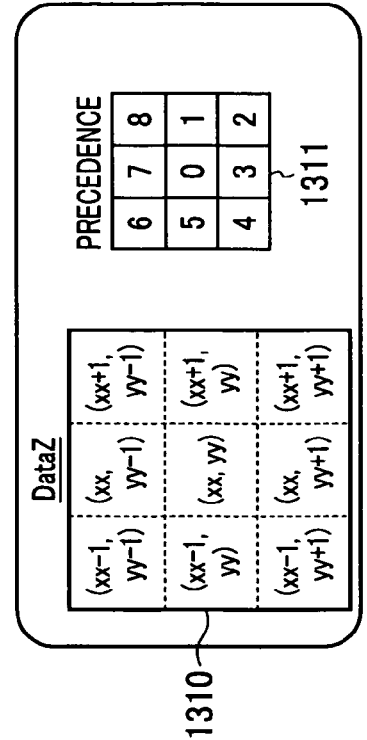
Figure 13C:
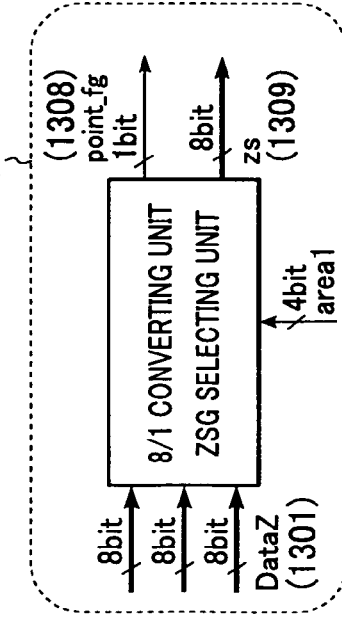

The block diagram in FIG. 13A shows a unit for generating the point_fg signal described with reference to FIG. 13B. First, an arbitrary bit is selected for one of three lines of the DataZ (1301) by a register A4 (1304) and a register A5 (1305). In the embodiment, a minor flag of bit 4 is selected by the register A4 (1304), and a font flag of bit 2 is selected by the register A5 (1305). Then, integration is performed in an AND gate 1306, so that a minor image signal is generated.

The same process is performed for each of the other lines to generate minor image signals in the 2×2 or 3×3 area. Then, these signals are added through an OR gate 1308 to generate the point_fg signal 1308. The area is selected based on the register TT, as in the above-description. Further, in the embodiment, a signal selected by the register A4 (1304) can be inverted by a register A8 (1310), as shown in FIG. 13A, but the selected signal may be used in a non-inverted form.

Next, the process of generating a ZSG signal in the ZSG selecting unit will be described. Herein, an input DataZ signal at an arbitrary position is selected in accordance with the above-described area 1 signal 1211. The arbitrary position is any of positions 0 to 8 of the precedence 1311 shown in FIG. 13C. The center (target pixel) corresponds to 0 of bit 4 of the area 1 signal 1211. In the other pixels, the number allotted to each pixel corresponds to a bit value of the area 1 signal 1211.

In this way, by selecting the DataZ signal 1301 corresponding to the area 1 signal 1211, resolution conversion from 1200 dpi to 600 dpi can be performed in accordance with the image-area signal for each pixel and the characteristic of the density level of each pixel, instead of simply thinning every other pixel and every other line.

In FIG. 4, reference numeral 412 denotes a bit converting unit, which includes a memory of 4-bit address space and 2-bit data. The detail of the process is omitted, but the overview of memory data used in the embodiment will be described with reference to FIGS. 14A and 14B. In FIG.

14A, bit 3 (1401) to bit 0 (1404) in the horizontal axis indicate coupled values of output area 2 (1210) from the above-described area determining unit 410 and output point_fg (1308) from the 8/1 converting & ZSG selecting unit 411. The coupled value is point_fg [3 down to 3]+area 2 [2 down to 0]. A 4-bit signal can be generated by performing this calculation. Accordingly, the horizontal axis of FIG. 14A is represented by bit 3 (1401) to bit 0 (1404).

Bit 3 to bit 0 are indicated in decimal notation in an input axis 1405 in the vertical axis. An output axis 1406 indicates output signal values of 2 bits, and meanings (1407 to 1422) in the margin are given in the embodiment. For example, when input=1, it is determined to be a character image (font: 1408) and 3 is output as output 1406. When input=2, it is determined to be graphic 1409 and 1 is output.

The output corresponds to the sd signal 701 input to the mask selection signal generating unit 108 shown in FIG. 1. That is, when 3 is output, any of Nos. 3 to 7, which have been calculated by the product-sum operation processing unit 106, is selected by using the mask selection signal generating unit 108, and when 1 is output, No. 1, which has been calculated by the product-sum operation processing unit 106, is selected by using the mask selection signal generating unit 108. When the sd signal is 3, one of the Nos. 3 to 7, which have been calculated in the product-sum operation processing unit 106 in advance, is selected based on the value of L signal (density value of the target pixel). The detail of this process has been described above.

In this way, by selecting one of the plurality of values, which have been calculated by the product-sum operation processing unit 106 in advance, 1200 dpi can be optimally converted to 600 dpi for each type of image, that is, for each pixel.

Incidentally, "minor" in the margin (1416 to 1422) corresponding to input=9 to 15 in FIG. 14A represents the existence of a minor flag. That is, "minor" represents that minor font, minor graphic including extremely thin lines, or minor image existed in an arbitrary area. In that case, 2 is output. As a result, the sd signal 701 is 2, and thus the value of No. 2 is output in the product-sum operation processing unit 106. That is, a target pixel value which is not processed by a product-sum operation is output as is.

This in because by performing the product-sum operation, 1200 dpi data can be expressed in 600 dpi, but minor fonts and thin lines may be broken due to the characteristic of electrophotography or the line width may be significantly changed, and thus readability and image quality are deteriorated disadvantageously. In order to solve this problem, the target pixel value is output as is for minor font, so that deterioration in readability/image quality can be prevented and that expression of 1200 dpi data by 600 dpi data can be realized.

In this way, by selecting one of the results of the product-sum operation processing unit 106 in accordance with a 600 dpi image-area signal of graphic/font/image equivalent to 1200 dpi, resolution can be optimally converted from 1200 dpi to 600 dpi in accordance with each image area, and thus high-resolution image processing can be obtained.

Figure 15:
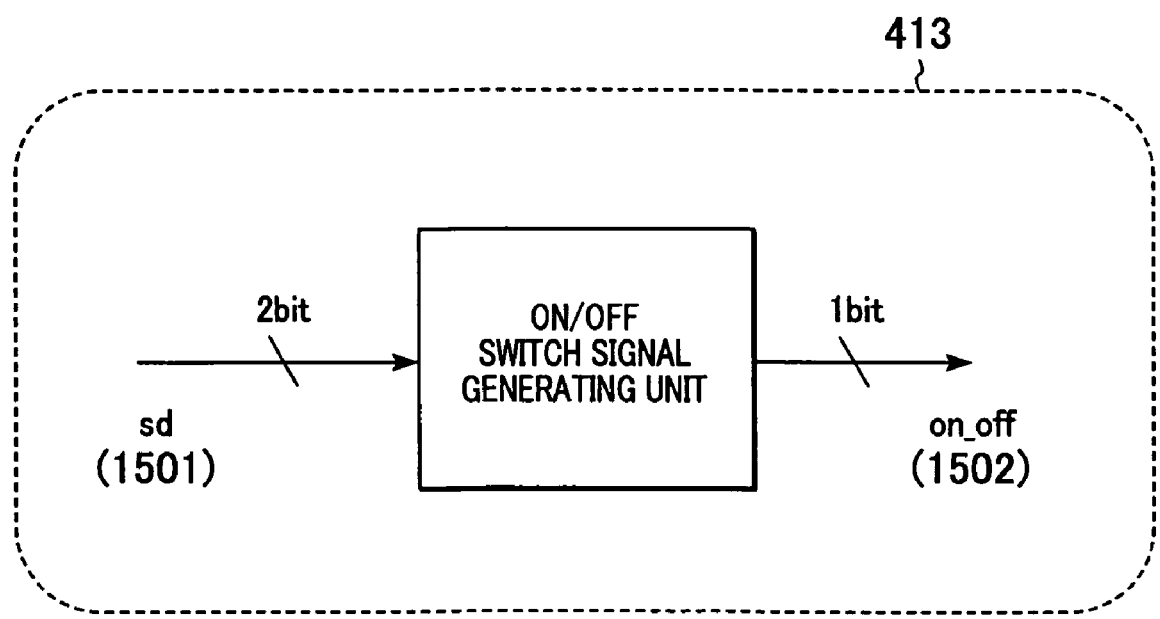
FIG. 15 is a functional block diagram showing an example of the configuration of an ON/OFF switch signal generating unit of the embodiment.

In FIG. 4, reference numeral 413 denotes an ON/OFF switch signal generating unit, and the details thereof will be described with reference to FIG. 15. FIG. 15 is a block diagram showing the entire ON/OFF switch signal generating unit 413. The ON/OFF switch signal generating unit 413 generates an on_off signal 1502 based on the sd signal 1501 generated by the bit converting unit 412. Specifically, it outputs 1 when the sd signal 1501 is 3, and outputs 0 for other cases.

Figure 16A:
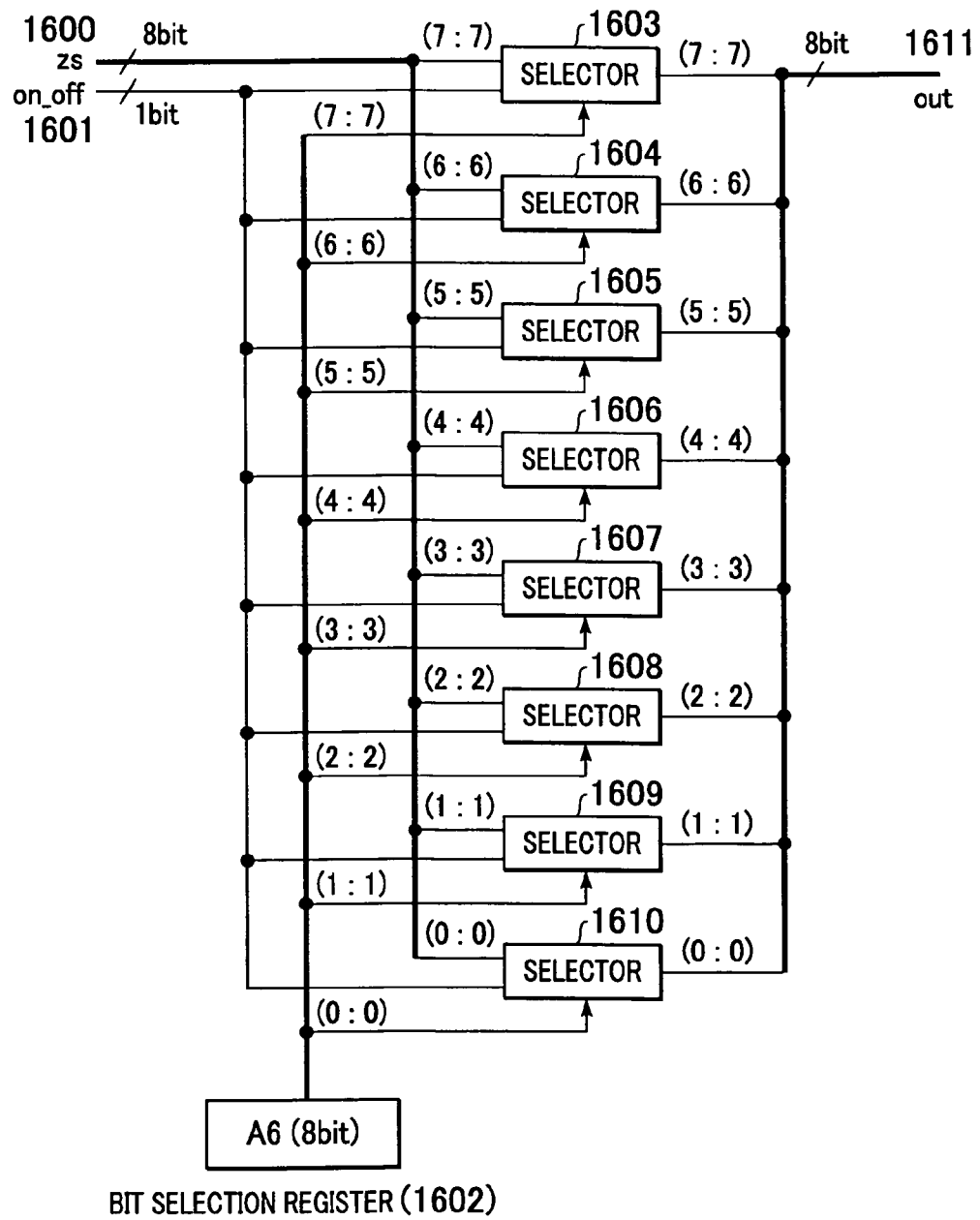
FIGS. 16A and 16B are functional block diagrams showing an example of the configuration of a SWAP unit of the embodiment.
Figure 16B:
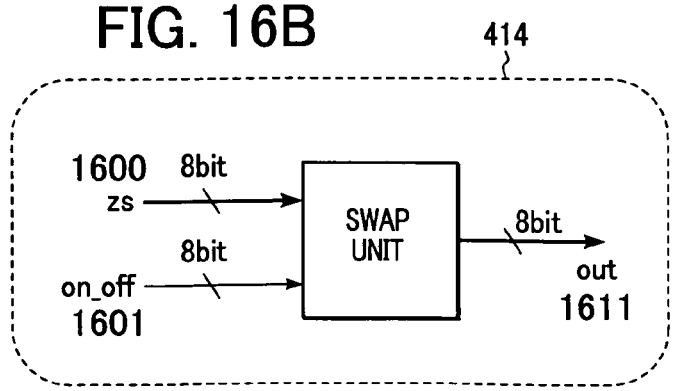

A SWAP unit 414 rewrites an arbitrary bit in accordance with the on_off signal output from the ON/OFF switch signal generating unit 413. The details are shown in FIGS. 16A and 16B. FIG. 16B is a block diagram showing the entire SWAP unit 414, and FIG. 16A shows an example of an internal configuration of the SWAP unit 414. As shown in FIG. 16B, a zs signal 1600 of 8 bits and the on_off signal 1601 of 1 bit are input to the SWAP unit 414, and an out signal 1611 of 8 bits is output therefrom.

A specific process performed in the SWAP unit 414 will be described below with reference to FIG. 16A. A bit selection register A6 (1602) has 8 bits for specifying a bit to be replaced. The register has a bit selector configuration which can replace an arbitrary bit of the input zs signal 1600 with the on_off signal 1601 in the selectors 1603 to 1610.

In this configuration, 1 is set to an arbitrary bit set by the register A6 (1602) only when the sd signal 1600 is 3, and 0 is set in the other cases. That is, when the sd signal 1600 is 3, that means product-sum operation has been performed, and thus the signal indicating the operation has been performed is added to the image-area signal.

With this configuration, the image-area signal converting unit 101 outputs the image-area signal which has been converted to 600 dpi and the sd signal indicating that product-sum operation has been performed.

By performing an image forming process, such as color processing and compression, in the image processing unit 304, data having an image quality equivalent to 1200 dpi can be processed as 600 dpi data. That is, a FiFo memory and a compression memory need not be added, and processing speed need not be increased. In other words, 1200 dpi data can be processed by using hardware for 600 dpi data, and thus a low-cost controller can be obtained.

Further, by processing image data using the method of the present invention, high-quality data equivalent to 1200 dpi can be output by using a printer for 600 dpi, instead of an expensive printer for 1200 dpi.

In the embodiment, the printer 305 is used. Therefore, according to the present invention, high-quality processing and high-resolution output equivalent to 1200 dpi can be realized by using controller/printer of a 600 dpi processing system.

As described above, according to the invention corresponding to the embodiment, high-resolution images can be output while suppressing load to a printer and controller processing. That is, by converting 1200 dpi data to 600 dpi data while maintaining phase information of 1200 dpi, high-resolution output can be realized, and at the same time, increase in the cost due to the spec up of hardware can be prevented. For example, proportions of characters (font) and lines, which cannot be improved by a smoothing technology for obtaining a smooth image having high-resolution edge portions (the smoothing technology is disclosed in, for example, U.S. Pat. No. 5,465,157), can be expressed in a resolution equivalent to 1200 dpi by 600 dpi output. In other words, an image-quality level of 1200 dpi can be expressed by using a printer of 600 dpi output.

Further, by using an image-area signal and density-level information of each pixel, optimal data conversion can be performed for each object, such as text and photograph. In addition, by performing the processing in the controller, 1200 dpi data can be optimally converted to 600 dpi data by considering the non-linear characteristic peculiar to electrophotography. Of course, if expansion to bitmap data is performed at 1200 dpi, the data is immediately converted to 600 dpi, and thus all the processes in the controller can be performed by a 600 dpi processing spec. Accordingly, high-resolution image data can be output while performing processes in the controller at high speed and suppressing an increase in the cost.

(Modification)

Next, a modification of the present invention will be described. In a basic configuration of the apparatus of the modification, parts which are the same as those in the above-described embodiment are denoted by the same reference numerals, and the corresponding description will be omitted.

Figure 17:
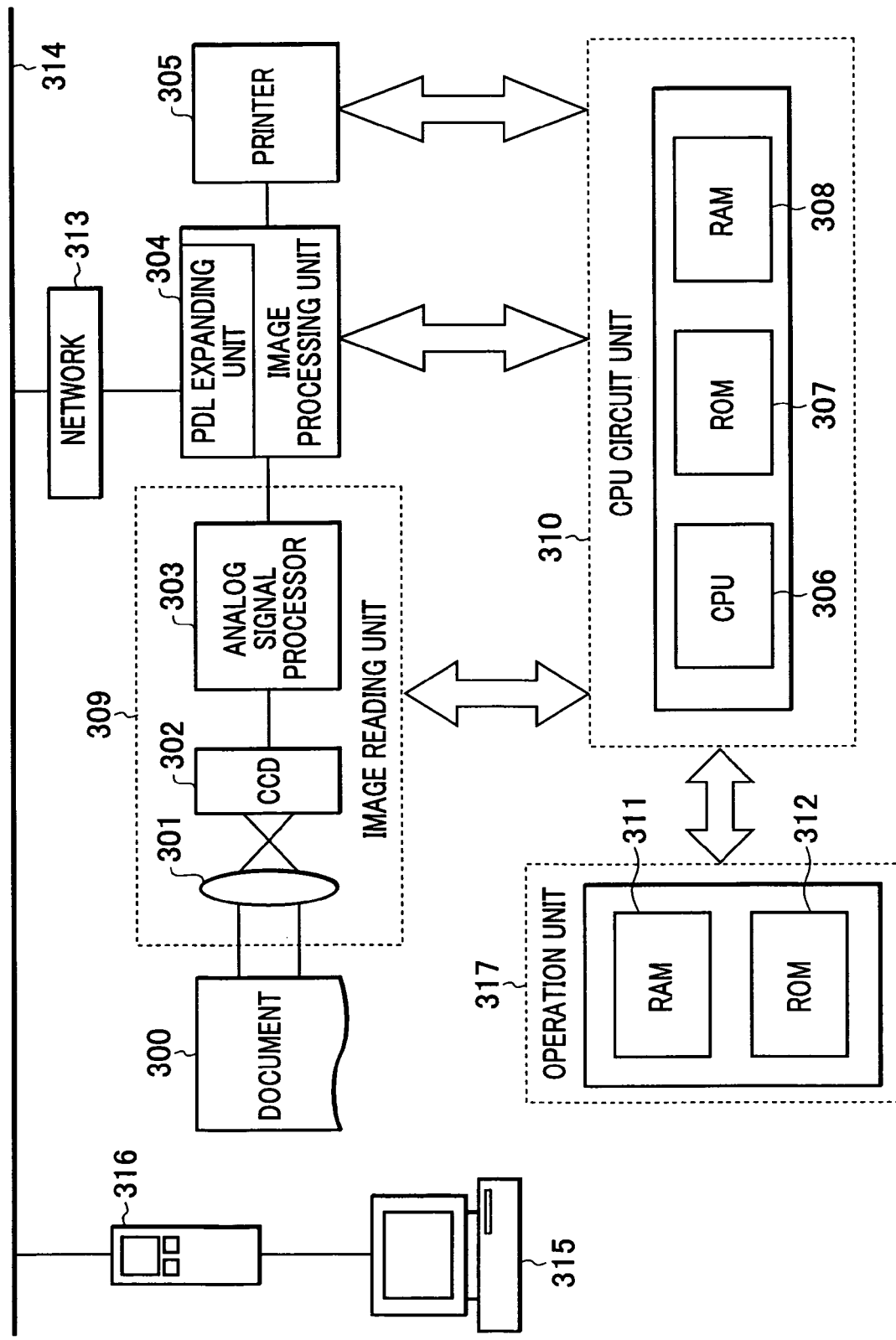
FIG. 17 is a block diagram showing the system structure of a modification of the present invention.

In the modification shown in FIG. 17, an image signal is directly transmitted from an external controller 316 to the image processing unit 304, instead of transmitting a PDL signal from the PC through the network to the image processing unit 304 as in the above-describe embodiment.

The basic configuration is almost the same as in the above-described embodiment, and thus only different parts will be described. The PC 315 in FIG. 17 outputs signals of PostScript language and LIPS, which is a PDL language developed by Canon. In the modification, the external controller 316 receives the signals.

In the external controller 316, PDL data is expanded so as to form 1200 dpi image data and to perform color processing, image compression, and spool processing to an HDD or memory, as in the image processing unit 304 described in the embodiment. Then, the controller 316 transmits a 1200 dpi signal through the network cable 314 to the network 313.

The above-described various types of image processing is performed to the transmission data, and the data is compressed and is transmitted as 1200 dpi bitmap data. At this time, the 1200 dpi image-area signal described in the embodiment is also compressed, which is transmitted to the network 313.

The network 313 outputs the received compressed signal to the image processing unit 304. The image processing unit 304 decompresses the received data so as to obtain a 1200 dpi image signal and an image-area signal, which are input to the image signal converting unit 103 and the image-area signal converting unit 101 shown in FIG. 1, respectively.

The following processes are the same as in the embodiment. Finally, high-quality data equivalent to 1200 dpi is output from the printer 305 having a 600 dpi engine. The data can be dealt as 600 dpi data in the internal processing of the image processing unit 304, and thus advantages can be obtained in both performance and cost.

Further, as in the above embodiment, improvement in proportion of characters (font) as well as image quality at edge portions can be obtained by using the present invention.

As described above, the modification is characterized in that an image quality equivalent to 1200 dpi can be obtained by using any type of controller, which is a different point from the above embodiment. That is, even when color processing and PDL language are restrained, an inexpensive output system of 1200 dpi can be obtained simply by preparing a necessary external controller according to use.

The present invention can be achieved by supplying program codes of software for realizing the functions of the embodiment or modification to a system or apparatus through a recording medium, so that a computer (or CPU or MPU) of the system or the apparatus reads and executes the program codes stored in the recording medium.

In that case, the program codes read from the recording medium execute the functions of the above-described embodiment or modification, and thus the recording medium storing the program codes is included in the present invention. As the recording medium for supplying the program codes, a floppy disk, a hard disk, an optical disk, a magneto-optical disk, a DVD-ROM, a DVD-RAM, a CD-ROM, a CD-R, a magnetic tape, a nonvolatile memory card, or ROM can be used.

The functions of the above-described embodiment or modification can be realized by executing the program codes read by the computer. Alternatively, the operating system (OS) operated in the computer may perform part or whole of actual processing based on instructions of the program codes, so that the functions of the above-described embodiment or modification are realized.

Further, after the program codes read from the recording medium has been written in a memory provided in an expansion card inserted to the computer or an expansion unit connected to the computer, a CPU or the like provided in the expansion card or the expansion unit may execute part or whole of actual processing based on instructions of the program codes, so that the functions of the above-described embodiment or modification can be realized. For example, the processing may be performed by a driver in the PC.

As described above, according to the present invention, effects of a resolution converting process can be suppressed and load to a printer and a controller can be suppressed even when resolution is decreased, and thus high-resolution images can be output.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing apparatus for converting first image data of a first resolution N to second image data of a second resolution M, which is lower than the first resolution N, so as to output the second image data, the apparatus comprising:

a processing unit for determining the position of a target pixel in the first image data in accordance with the ratio of the second resolution M to the first resolution N, wherein the processing unit uses the position of the target pixel to provide a predetermined area, and the processing unit outputs a plurality of pixel values based on values of pixels in the predetermined area;

a selection signal generating unit for generating a selection signal in accordance with a value of the target pixel and an attribute signal representing the attribute of the target pixel; and an output unit for selecting one of the plurality of pixel values generated by the processing unit by using the selection signal so as to output the selected value as the second image data.

2. An image processing apparatus according to claim 1, wherein the plurality of pixel values include a first pixel value obtained by detecting a maximum pixel value in the predetermined area, a second pixel value obtained by performing a product-sum operation by using each of the pixels in the predetermined area, and a third pixel value corresponding to the value of the target pixel.

3. An image processing apparatus according to claim 2, wherein, in the product-sum operation, a plurality of product-sum operation values are output by using a plurality of masks, each mask having an arbitrary weighting coefficient.

4. An image processing apparatus according to claim 2, wherein the predetermined area comprises a plurality of predetermined areas of different sizes, and a maximum pixel value is detected in each of the areas.

5. An image processing apparatus according to claim 1, further comprising an attribute signal converting unit, wherein the attribute signal used for generating the selection signal is obtained by converting an input attribute signal of the first resolution N to the second resolution M.

6. An image processing apparatus according to claim 5, wherein the attribute signal converting unit converts the input attribute signal of the first resolution N to a signal of a resolution between the first resolution N and the second resolution M, and then converts the signal to the attribute signal of the second resolution M.

7. An image processing apparatus according to claim 5, further comprising an area determining unit for determining one of a plurality of areas based on the attribute signal of the second resolution M, wherein the area determining unit selects one of the plurality of areas, determines the position of a pixel having a maximum value in the selected area based on predetermined precedence, and outputs the sum of pixel values in the selected area.

8. An image processing apparatus according to claim 7, further comprising:
a minor image signal generating unit for detecting a minor image in the area and generating a signal determining the presence/absence of the minor image; and
an attribute signal selecting unit for selecting the attribute signal of the first resolution M at an arbitrary position in accordance with information of the determined pixel position in the area.

9. An image processing apparatus according to claim 8, further comprising a unit for generating the attribute signal used in the selection signal generating unit based on a coupled value of the sum of pixel values in the area selected by the area determining unit and the value of the minor image signal.

10. An image processing apparatus for converting first image data of a first resolution N to second image data of a second resolution M, which is lower than the first resolution N, so as to output the second image data, the apparatus comprising:
a processing unit for determining the position of a target pixel in the first image data in accordance with the ratio of the second resolution M to the first resolution N, and generating and outputting a plurality of pixel values based on values of pixels in a predetermined area defined by the target pixel;
a selection signal generating unit for generating a selection signal in accordance with the value of the target pixel and an attribute signal representing the attribute of the target pixel; and
an output unit for selecting one of the plurality of pixel values generated by the processing unit by using the selection signal so as to output the selected value as the second image data,
wherein selection of the plurality of pixel values generated by the processing unit is switched in accordance with the value of the attribute signal indicating the presence/absence of a minor image in the predetermined area.

11. An image processing apparatus according to claim 10, wherein, when the value of the attribute signal indicates the presence of the minor image in the predetermined area, a pixel value selected by the selection signal is the value of the target pixel.

12. An image processing method for converting first image data of a first resolution N to second image data of a second resolution M, which is lower than the first resolution N, so as to output the second image data, the method comprising:
a processing step of determining the position of a target pixel in the first image data in accordance with the ratio of the second resolution M to the first resolution N, wherein the processing step uses the position of the target pixel to provide a predetermined area, and the processing unit outputs a plurality of pixel values based on values of pixels in the predetermined area;
a selection signal generating step of generating a selection signal in accordance with a value of the target pixel and an attribute signal representing the attribute of the target pixel; and
an output step of selecting one of the plurality of pixel values generated in the processing step by using the selection signal so as to output the selected value as the second image data.

13. An image processing method according to claim 12, wherein the plurality of pixel values include a first pixel value obtained by detecting a maximum pixel value in the predetermined area, a second pixel value obtained by performing a product-sum operation by using each of the pixels in the predetermined area, and a third pixel value corresponding to the value of the target pixel.

14. An image processing method according to claim 13, wherein, in the product-sum operation, a plurality of product-sum operation values are output by using a plurality of masks, each mask having an arbitrary weighting coefficient.

15. An image processing method according to claim 13, wherein the predetermined area comprises a plurality of predetermined areas of different sizes, and a maximum pixel value is detected in each of the areas.

16. An image processing method according to claim 12, further comprising an attribute signal converting step, wherein the attribute signal used for generating the selection signal in the selection signal generating step is obtained by converting an input attribute signal of the first resolution N to the second resolution M in the attribute signal converting step.

17. An image processing method according to claim 16, wherein, in the attribute signal converting step, the input attribute signal of the first resolution N is converted to a signal of a resolution between the first resolution N and the second resolution M, and is then converted to the attribute signal of the second resolution M.

18. An image processing method according to claim 16, further comprising an area determining step of determining one of a plurality of areas based on the attribute signal of the second resolution M, wherein, in the area determining step, one of the plurality of areas is selected, the position of a pixel having a maximum value in the selected area is determined based on predetermined precedence, and the sum of pixel values in the selected area is output.

19. An image processing method according to claim 18, further comprising:
a minor image signal generating step of detecting a minor image in the area and generating a signal determining the presence/absence of the minor image; and an attribute signal selecting step of selecting the attribute signal of the first resolution M at an arbitrary position in accordance with information of the determined pixel position in the area.

20. An image processing method according to claim 19, further comprising a step of generating the attribute signal used in the selection signal generating step based on a coupled value of the sum of pixel values in the area selected in the area determining step and the value of the minor image signal.

21. An image processing method for converting first image data of a first resolution N to second image data of a second resolution M, which is lower than the first resolution N, so as to output the second image data, the method comprising:
- a processing step of determining the position of a target pixel in the first image data in accordance with the ratio of the second resolution M to the first resolution N, and generating and outputting a plurality of pixel values based on values of pixels in a predetermined area defined by the target pixel;
- a selection signal generating step of generating a selection signal in accordance with the value of the target pixel and an attribute signal representing the attribute of the target pixel; and
- an output step of selecting one of the plurality of pixel values generated in the processing step by using the selection signal so as to output the selected value as the second image data,
- wherein selection of the plurality of pixel values generated in the processing step is switched in accordance with the value of the attribute signal indicating the presence/absence of a minor image in the predetermined area.

22. An image processing method according to claim 21, wherein, when the value of the attribute signal indicates the presence of the minor image in the predetermined area, a pixel value selected by the selection signal is the value of the target pixel.

23. An image processing circuitry for outputting image data having a first resolution on an image device having a second resolution, by appropriate selection of a target pixel in the first image data to permit image data to be output at the second resolution, the processing circuitry comprising:
- memory circuitry; and
- processing circuitry for outputting a plurality of pixel values including a first and a second pixel value for selection as output image data with the second resolution,
- wherein the first pixel value corresponds to the value of the target pixel, and
- wherein the second pixel value corresponds to a result of a product-sum operation performed using both the target pixel and another pixel selected from the first image data.

24. The image processing circuitry of claim 23, wherein the product-sum operation includes use of different weighting coefficients for each of the target pixel and the selected pixel value of the first image data.

* * * * *